US008164428B2

(12) United States Patent
Sutardja

(10) Patent No.: US 8,164,428 B2
(45) Date of Patent: *Apr. 24, 2012

(54) POWER CONTROL DEVICE

(75) Inventor: Sehat Sutardja, Los Altos Hills, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,072

(22) Filed: Oct. 31, 2011

(65) Prior Publication Data

US 2012/0038467 A1    Feb. 16, 2012

Related U.S. Application Data

(63) Continuation of application No. 11/964,172, filed on Dec. 26, 2007, now Pat. No. 8,049,599.

(60) Provisional application No. 60/938,550, filed on May 17, 2007, provisional application No. 60/890,337, filed on Feb. 16, 2007, provisional application No. 60/882,757, filed on Dec. 29, 2006.

(51) Int. Cl.
| | |
|---|---|
| G05B 11/01 | (2006.01) |
| G08C 19/16 | (2006.01) |
| H01J 7/44 | (2006.01) |
| H01K 1/62 | (2006.01) |
| G05F 1/00 | (2006.01) |

(52) U.S. Cl. ............... 340/12.33; 340/12.32; 340/12.39; 315/72; 315/291

(58) Field of Classification Search ........... 340/12.32, 340/12.33, 12.39; 315/72, 291
See application file for complete search history.

(56) References Cited

U.S. PATENT DOCUMENTS

| | | | |
|---|---|---|---|
| 4,200,862 | A | 4/1980 | Campbell et al. |
| 4,367,557 | A | 1/1983 | Stern et al. |
| 4,719,446 | A | 1/1988 | Hart |
| 5,126,634 | A | 6/1992 | Johnson |
| 5,352,957 | A | 10/1994 | Werner |
| 5,432,500 | A | 7/1995 | Scripps |
| 5,614,811 | A | 3/1997 | Sagalovich et al. |
| 5,689,261 | A | 11/1997 | Mehta et al. |
| 5,691,691 | A | 11/1997 | Merwin et al. ............. 375/259 |
| 6,229,433 | B1 | 5/2001 | Rye et al. |
| 2004/0227472 | A1 | 11/2004 | Gaus et al. |
| 2008/0278297 | A1 | 11/2008 | Steiner et al. |

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; Aug. 20, 1999;531 pages.

(Continued)

*Primary Examiner* — Brent Swarthout
*Assistant Examiner* — Andrew Bee

(57) ABSTRACT

A controllable light bulb comprises an electrical connector, a receiver module, an electronic switch, a translucent casing, and a light producing element. The electrical connector receives a power signal. The receiver module is powered by the power signal received via the electrical connector and determines control parameters based upon on/off modulation of the power signal. The receiver module generates a control signal based upon the control parameters while the power signal is on. The electronic switch outputs an output power signal and reduces the output power signal based on the control signal. The translucent casing encloses the light producing element. The light producing element receives the output power signal.

31 Claims, 20 Drawing Sheets

OTHER PUBLICATIONS

IEEE P802.11gID8.2, Apr. 2003 (Supplement to ANSI/IEEE Std 802.11-1999(Reaff 2003>>; Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.

IEEE 802.11n; IEEE 802.11-04/0889r6; IEEE P802.11 Wireless LANs; TGn Sync Proposal Technical Specification; Syed Aon Muitaba; Agere Systems Inc.; May 18, 2005; 131 pages.

IEEE Std 802.11a-1999 (Supplement to IEEE Std 802.11-1999); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-speed Physical Layer in the 5 GHz Band; LAN/MAN Standards Committee of the IEEE Computer Society; Sep. 16, 1999; 91 pages.

IEEE Std 802.11 b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.16/2004 (Revision of I~Ee Std 802.16-2001) IEE Standard for Local and metropolitan area networks; Part 16: Air Interface for Fixed Broadband Wireless Access Systems; IEEE Computer Society and the IEEE Microwave Theory and Techniquest Society; Oct. 1, 2004; 893 pages.

IEEE Std 802.11 hTM__2003 [Amndmnt to IEEE Std 802.11TM, 99 Ed. (Reaff 03) as amended by IEEE Stds 802.11a™ -1999, 802.11b™ -1999, 802.11b™ -1999/Cor 1-2001,802.11d™ -2001, 802.11g™__2003];IEEE Std for Info tech-Telecomms and info exchange between systems-Local and metropolitan area networks-Specific reqs.;Part11: Wireless LAN Medium Access Control (MAC) & Physical Layer (PHY) specs; Amendment 5: Spectrum and Transmit Power Mgmt Exts in the 5 GHz band in Europe; IEEE Computer Society; LAN/MAN Stds Comm; Oct. 14, 2003 75 pages.

IEEE 802.20-PD-06; IEEE P 802.20™ V14; Jul. 16, 2004; Draft 802.20 Permanent Document; System Requirements for IEEE 802.20 Mobile Broadband Wireless Access Systems—Version 14; 24 pages.

Specification of the Bluetooth System—Specification vol. 0; Master Table of Contents & Compliance Requirements; Covered Core Package version: 2.0 +EDR; Current Master TOC issued: Nov. 4, 2004; Part A, pp. 1-74; vol. 1, pp. 1-92; vol. 2 & 3, pp. 1-814; vol. 4, pp. 1-250.

Insteon Compared; SmartLabs Technology; Jan. 2, 2006; 69 pages.

Insteon The Details; Smarthome Technology; Aug. 11, 2005; 68 pages.

IEEE Std 802.3™ __2002 (Revision of IEEE Std 802.3, 2000 Edition); IEEE Standard for Information technology-Telecommunications and information exchange between systems- Local and metropolitan area networks- Specific requirements; Part 3: Carrier sense multiple access with collision detection (CSMNCD) access method and physical layer specifications; IEEE Computer Society; LAN/MAN Standards Committee; Mar. 8, 2002; 1538 pages.

IEEE Std 802.15.1 TM__2002; IEEE Standard for Information technology- Telecommunications and information exchange between systems- Local and metropolitan area networks- Specific requirements; Part 15.1: Wireless Medium Access Control (MAC) and Physical Layer (PHY) Specifications for Wireless Personal Area Networks (WPANs); IEEE Computer Society; LAN/MAN Standards Committee; Jun. 14, 2002; 1168 pages.

X-10 PowerhouseTM Number One in Home Automation; Technical Note: The X-10 Powerhouse Power Line Interface Model #PL513 and Two-Way Power Line Interface Model #TW523 (for use with the RR501 Two-Way Transceiver Appliance Module); Revision 2.4; Dave Rye; Dec. 15, 1999; 11 pages.

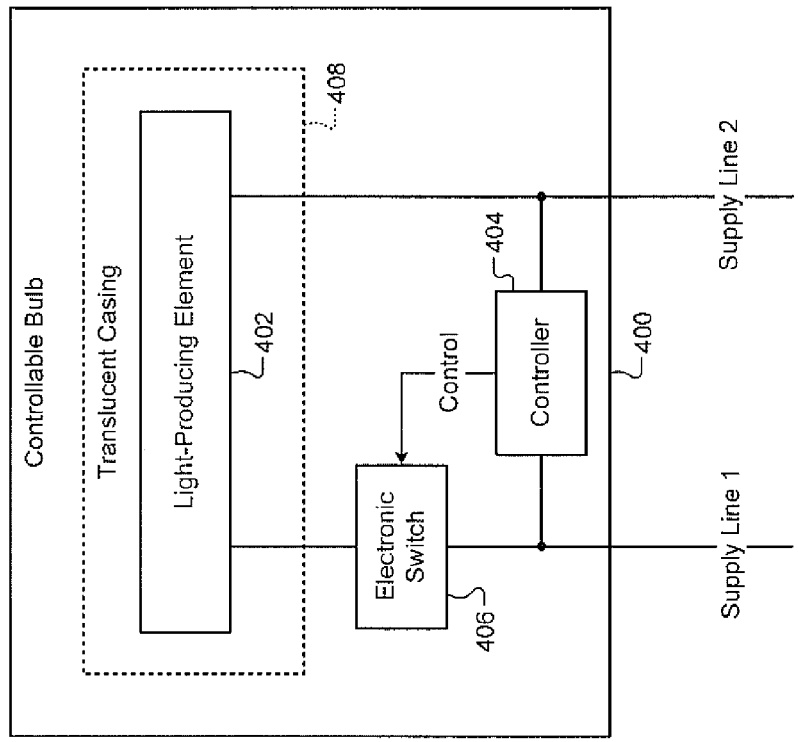
FIG. 6
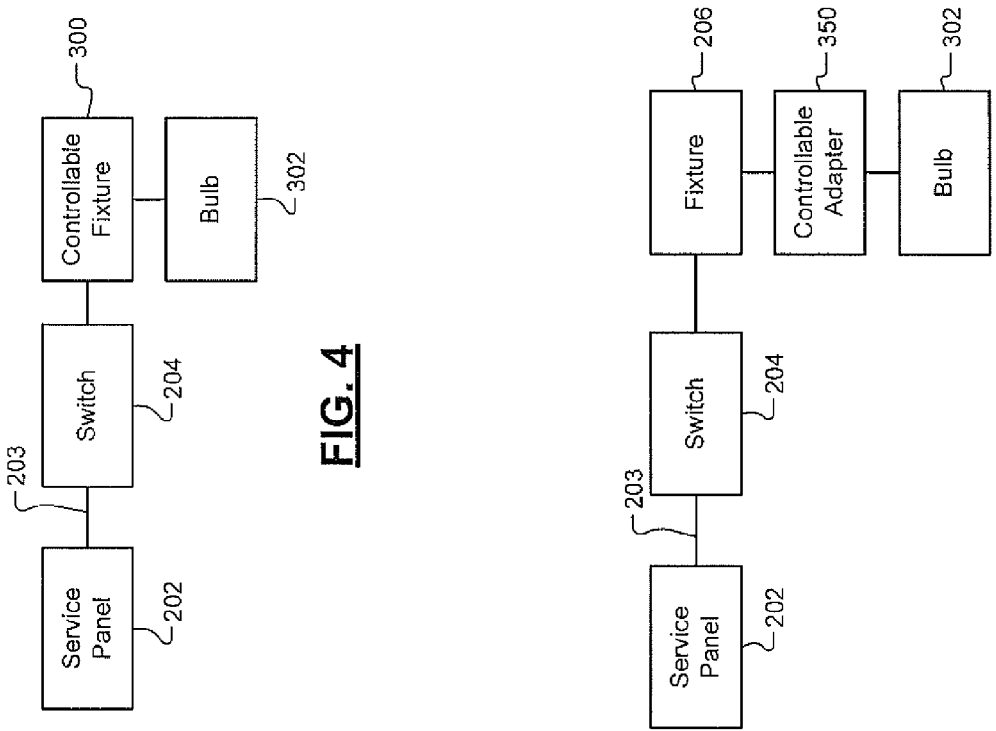
FIG. 4
FIG. 5

| 1152 | |
|---|---|
| Off-Cycles | Function |
| 1 | Reserved |
| 2 | Transmit Identification Code |
| 3 | Update Identification Code |
| 4 | Reset Identification Code |

| 1154 | |
|---|---|
| Off-Cycles | Function |
| 1 | Reserved |
| 2 | 5 min |
| 3 | 10 min |
| 4 | 20 min |
| 5 | 30 min |
| 6 | 40 min |
| 7 | 50 min |
| 8 | 1 hr |
| 9 | 1.5 hr |
| 10 | 2 hr |

| 1160 | |
|---|---|
| Sequence | Function |
| -,- | Reserved |
| -,- | Transmit Identification Code |
| -,- | Update Identification Code |
| -,- | Reset Identification Code |

| 1162 | |
|---|---|
| Sequence | Function |
| -,- | Reserved |
| -,- | 5 min |
| -,- | 10 min |
| -,- | 20 min |
| -,- | 30 min |
| -,- | 40 min |
| -,- | 50 min |
| -,- | 1 hr |
| -,- | 1.5 hr |
| -,- | 2 hr |

| 1170 | |
|---|---|
| Sequence | Function |
| 1010 | Reserved |
| 0110 | Transmit Identification Code |
| 1001 | Update Identification Code |
| 0101 | Reset Identification Code |

| 1172 | |
|---|---|
| Sequence | Function |
| 0000 | Reserved |
| 0001 | 5 min |
| 0010 | 10 min |
| 0011 | 20 min |
| 0100 | 30 min |
| 0101 | 40 min |
| 0110 | 50 min |
| 0111 | 1 hr |
| 1000 | 1.5 hr |
| 1001 | 2 hr |

FIG. 21

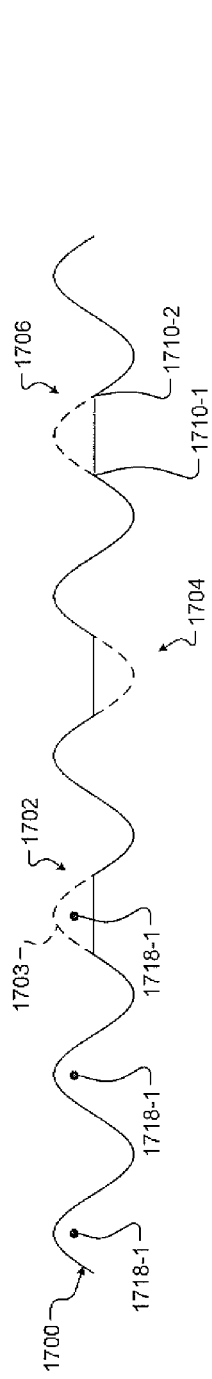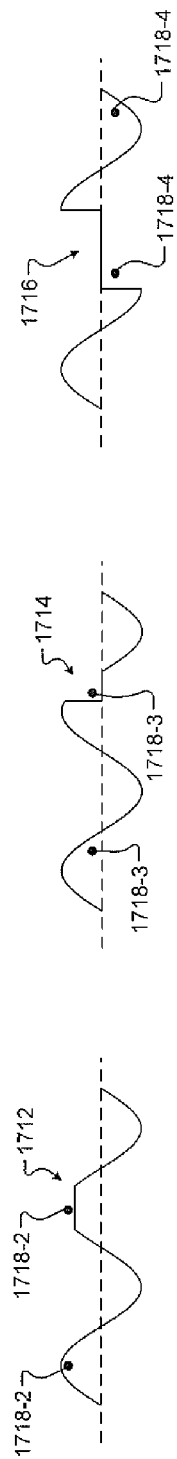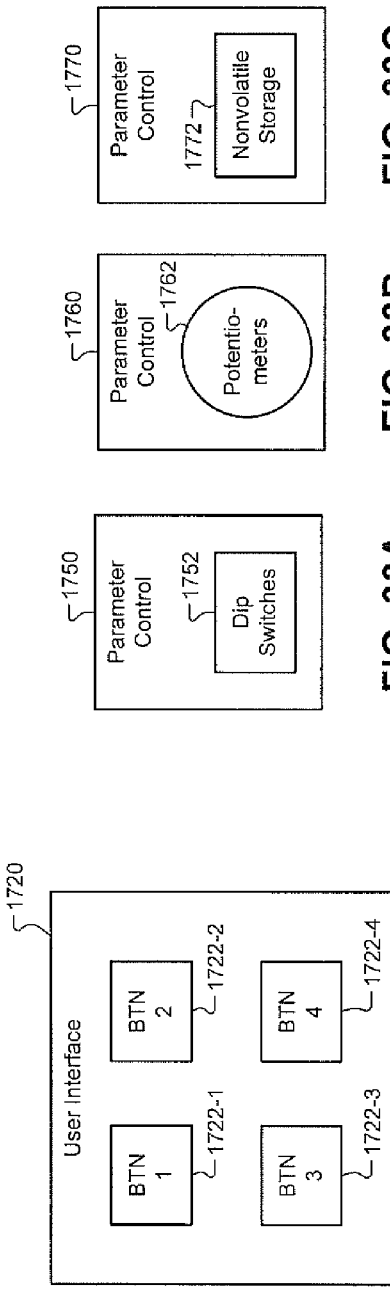

POWER CONTROL DEVICE

CROSS-REFERENCE TO RELATED APPLICATIONS

This present disclosure is a continuation of U.S. application Ser. No. 11/964,172, filed on Dec. 26, 2007, which claims priority under 35 U.S.C. §119(e) to U.S. Provisional Application Nos. 60/938,550, filed May 17, 2007, 60/890,337, filed Feb. 16, 2007, 60/882,757, filed Dec. 29, 2006. The disclosures of the above applications are incorporated herein by reference in their entirety.

FIELD

The present disclosure relates to lighting systems, and more particularly to controlling lighting systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a lighting system is depicted. A service panel 102 communicates with a switch 104. The switch 104 communicates with a light fixture 106. A light bulb 108 communicates with the light fixture 106. The switch 104 selectively allows current from the service panel 102 to flow through the light bulb 108 via the light fixture 106. In order to turn the light bulb 108 on and off, the switch 104 must be actuated.

To allow remote control of the light bulb 108, the switch 104 can be replaced with a power line carrier switch. The light bulb 108 can then be turned on and off locally as well as remotely, such as by a whole-house lights-off command. Replacing the switch 104, however, involves working with wires that normally carry full line voltage. Many homeowners will need to call an electrician to replace the switch 104, which is a costly process. In addition, the new switch's style must match the previous switch 104, or new wall plates will also need to be purchased and installed.

SUMMARY

A controllable light bulb comprises an electrical connector, a receiver module, an electronic switch, a translucent casing, and a light producing element. The electrical connector receives a power signal. The receiver module is powered by the power signal received via the electrical connector and determines control parameters based upon on/off modulation of the power signal. The receiver module generates a control signal based upon the control parameters while the power signal is on. The electronic switch outputs an output power signal and reduces the output power signal based on the control signal. The translucent casing encloses the light producing element. The light producing element receives the output power signal.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiver module determines the control parameters after the on/off modulation indicates a programming initiation sequence. The programming initiation sequence comprises a predetermined on/off sequence performed within a predetermined period of time. The electronic switch reduces the output power signal to approximately zero when the control signal is received. The electronic switch reduces the output power signal to a dimmed value when the control signal is received. The dimmed value is less than the power signal.

In still other features, the receiver module includes a power line carrier receiver module that receives data via the power signal, that is associated with a first address, and that accepts commands addressed to one of the first address and a global address. The control parameters include the first address and the receiver module generates the control signal based upon the data. The power line carrier receiver module performs an operation based upon the on/off modulation. The operation is at least one of a reset address operation, an update address operation, a broadcast connection operation, and a transmit address operation.

In other features, the receiver module further comprises a timing module that begins counting after the power signal is received. The control parameters include a predetermined value. The receiver module generates the control signal when the timing module reaches the predetermined value. The receiver module sets the predetermined value based on a duration that the power signal is on after a programming mode is initiated. The receiver module decreases the predetermined value when the power signal is turned off before the timer module reaches the predetermined value.

In further features, the receiver module increases the predetermined value when the power signal is turned off then on within a predetermined period after the timer module reaches the predetermined value. The receiver module decreases the predetermined value when the power signal is turned off, on, and off within a predetermined period, and before the timer module reaches the predetermined value. The receiver module increases the predetermined value when the power signal is turned off, on, off, and on within a predetermined period after the timer module reaches the predetermined value. The electrical connector comprises conducting male threads and a conducting tip. The light producing element comprises a metallic filament.

A method comprises receiving a power signal at a light bulb, monitoring on/off modulation of the power signal, determining control parameters based upon the on/off modulation, generating a control signal based upon the control parameters while the power signal is on, providing an output power signal to a light producing element of the light bulb, and reducing the output power signal based upon the control signal.

In other features, the monitoring comprises counting one of power signal presence and power signal absence over a predetermined period of time. The monitoring comprises collecting binary data at periodic sampling intervals, wherein a first binary state corresponds to power signal presence and a second binary state corresponds to power signal absence. The monitoring comprises collecting binary data by measuring periods of one of power signal presence and power signal absence, wherein a first binary state corresponds to periods shorter than a predetermined length and a second binary state corresponds to periods longer than the predetermined length.

In further features, the method further comprises detecting a programming initiation sequence from the on/off modulation before performing the determining. The programming initiation sequence comprises a predetermined on/off sequence detected within a predetermined period of time. The reducing includes reducing the output power signal to one of a dimmed value and an off value when the control signal is received. The method further comprises receiving data superimposed on the power signal; decoding the data into commands; selecting ones of the commands addressed to one of a first address and a global address, wherein the control parameters include the first address; and generating the control signal based upon the ones of the commands.

In still other features, the method further comprises performing a power line carrier operation based upon the on/off modulation. The operation is at least one of a reset address operation, an update address operation, a broadcast connection operation, and a transmit address operation. The method further comprises beginning timing a first period after the power signal is received. The control parameters include the first period. The generating the control signal is performed when the first period elapses. The method further comprises setting the first period based on a duration that the power signal is on after a programming mode is initiated.

In other features, the method further comprises decreasing the first period when the power signal is turned off before the first period elapses. The method further comprises increasing the first period when the power signal is turned off then on within a predetermined period after the first period elapses. The method further comprises decreasing the first period when the power signal is turned off, on, and off within a predetermined period and before the first period elapses. The method further comprises increasing the first period when the power signal is turned off, on, off, and on within a predetermined period after the reducing has been performed.

A controllable light bulb comprises electrical connection means for receiving a power signal; receiving means for determining control parameters based upon on/off modulation of the power signal and for generating a control signal based upon the control parameters while the power signal is on, wherein the receiving means is powered by the power signal received via the electrical connection means; electronic switching means for outputting an output power signal and for reducing the output power signal based upon the control signal; light producing means for receiving the output power signal and for producing light; and a translucent casing for enclosing the light producing means.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiving means determines the control parameters after the on/off modulation indicates a programming initiation sequence. The programming initiation sequence comprises a predetermined on/off sequence performed within a predetermined period of time. The electronic switching means reduces the output power signal to approximately zero when the control signal is received. The electronic switching means reduces the output power signal to a dimmed value when the control signal is received. The dimmed value is less than the power signal.

In still other features, the receiving means includes power line carrier receiving means for receiving data via the power signal and for accepting commands addressed to one of a first address and a global address. The control parameters include the first address and the receiving means generates the control signal based upon the data. The power line carrier receiving means performs an operation based upon the on/off modulation.

In other features, the operation is at least one of a reset address operation, an update address operation, a broadcast connection operation, and a transmit address operation. The receiving means further comprises timing means for counting after the power signal is received. The control parameters include a predetermined value. The receiving means generates the control signal when the timing means reaches the predetermined value. The receiving means sets the predetermined value based on a duration that the power signal is on after a programming mode is initiated.

In further features, the receiving means decreases the predetermined value when the power signal is turned off before the timer module reaches the predetermined value. The receiving means increases the predetermined value when the power signal is turned off then on within a predetermined period after the timer module reaches the predetermined value. The receiving means decreases the predetermined value when the power signal is turned off, on, and off within a predetermined period, and before the timer module reaches the predetermined value. The receiving means increases the predetermined value when the power signal is turned off, on, off, and on within a predetermined period after the timer module reaches the predetermined value.

A controllable light bulb adapter comprises a first electrical connector, a receiver module, an electronic switch, and a second electrical connector. The first electrical connector receives a power signal from a light fixture. The receiver module is powered by the power signal received via the first electrical connector, determines control parameters based upon on/off modulation of the power signal, and selectively generates a control signal based upon the control parameters while the power signal is on. The electronic switch outputs an output power signal and reduces the output power signal based on the control signal. The second electrical connector receives a light bulb and provides the output power signal to the light bulb.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiver module determines the control parameters after the on/off modulation indicates a programming initiation sequence. The programming initiation sequence comprises a predetermined on/off sequence performed within a predetermined period of time. The electronic switch reduces the output power signal to approximately zero when the control signal is received. The electronic switch reduces the output power signal to a dimmed value when the control signal is received. The dimmed value is less than the power signal.

In still other features, the receiver module includes a power line carrier receiver module that receives data via the power signal, that is associated with a first address, and that accepts commands addressed to one of the first address and a global address. The control parameters include the first address and the receiver module generates the control signal based upon the data. The power line carrier receiver module performs an operation based upon the on/off modulation. The operation is at least one of a reset address operation, an update address operation, a broadcast connection operation, and a transmit address operation.

In other features, the receiver module further comprises a timing module that begins counting after the power signal is received. The control parameters include a predetermined value. The receiver module generates the control signal when the timing module reaches the predetermined value. The receiver module sets the predetermined value based on a duration that the power signal is on after a programming mode is initiated. The receiver module decreases the predetermined value when the power signal is turned off before the timer module reaches the predetermined value.

In further features, the receiver module increases the predetermined value when the power signal is turned off then on within a predetermined period after the timer module reaches the predetermined value. The receiver module decreases the predetermined value when the power signal is turned off, on, and off within a predetermined period, and before the timer module reaches the predetermined value. The receiver module increases the predetermined value when the power signal is turned off, on, off, and on within a predetermined period after the timer module reaches the predetermined value. The first electrical connector comprises conducting male threads and a conducting tip. The second electrical connector comprises conducting female threads and a conducting contact.

A method comprises receiving a power signal from a light fixture; monitoring on/off modulation of the power signal; determining control parameters based upon the on/off modulation; generating a control signal based upon the control parameters while the power signal is on; providing a switchable power signal to a light bulb; and reducing the switchable power signal based upon the control signal.

In other features, the monitoring comprises counting one of power signal presence and power signal absence over a predetermined period of time. The monitoring comprises collecting binary data at periodic sampling intervals, wherein a first binary state corresponds to power signal presence and a second binary state corresponds to power signal absence. The monitoring comprises collecting binary data by measuring periods of one of power signal presence and power signal absence, wherein a first binary state corresponds to periods shorter than a predetermined length and a second binary state corresponds to periods longer than the predetermined length.

In further features, the method further comprises detecting a programming initiation sequence from the on/off modulation before performing the determining. The programming initiation sequence comprises a predetermined on/off sequence detected within a predetermined period of time. The reducing includes reducing the output power signal to one of a dimmed value and an off value when the control signal is received.

In still other features, the method further comprises receiving data superimposed on the power signal; decoding the data into commands; selecting ones of the commands addressed to one of a first address and a global address, wherein the control parameters include the first address; and generating the control signal based upon the ones of the commands. The method further comprises performing a power line carrier operation based upon the on/off modulation. The operation is at least one of a reset address operation, an update address operation, a broadcast connection operation, and a transmit address operation.

In other features, the method further comprises beginning timing a first period after the power signal is received. The control parameters include the first period. The generating the control signal is performed when the first period elapses. The method further comprises setting the first period based on a duration that the power signal is on after a programming mode is initiated. The method further comprises decreasing the first period when the power signal is turned off before the first period elapses.

In further features, the method further comprises increasing the first period when the power signal is turned off then on within a predetermined period after the first period elapses. The method further comprises decreasing the first period when the power signal is turned off, on, and off within a predetermined period and before the first period elapses. The method further comprises increasing the first period when the switch is turned off, on, off, and on within a predetermined period after the reducing has been performed.

A controllable light bulb adapter comprises first electrical connection means for receiving a power signal; receiving means for determining control parameters based upon on/off modulation of the power signal and for generating a control signal based upon the control parameters while the power signal is on, wherein the receiving means is powered by the power signal received via the first electrical connection means; electronic switching means for outputting an output power signal and for reducing the output power signal based upon the control signal; and second electrical connection means for receiving a light bulb and for providing the switchable power signal to the light bulb.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiving means determines the control parameters after the on/off modulation indicates a programming initiation sequence. The programming initiation sequence comprises a predetermined on/off sequence performed within a predetermined period of time. The electronic switching means reduces the output power signal to approximately zero when the control signal is received. The electronic switching means reduces the output power signal to a dimmed value when the control signal is received. The dimmed value is less than the power signal.

In still other features, the receiving means includes power line carrier receiving means for receiving data via the power signal and for accepting commands addressed to one of a first address and a global address. The control parameters include the first address and the receiving means generates the control signal based upon the data. The power line carrier receiving means performs an operation based upon the on/off modulation. The operation is at least one of a reset address operation, an update address operation, a broadcast connection operation, and a transmit address operation.

In other features, the receiving means further comprises timing means for counting after the power signal is received. The control parameters include a predetermined value. The receiving means generates the control signal when the timing means reaches the predetermined value. The receiving means sets the predetermined value based on a duration that the power signal is on after a programming mode is initiated. The receiving means decreases the predetermined value when the power signal is turned off before the timer module reaches the predetermined value.

In further features, the receiving means increases the predetermined value when the power signal is turned off then on within a predetermined period after the timer module reaches the predetermined value. The receiving means decreases the predetermined value when the power signal is turned off, on, and off within a predetermined period, and before the timer module reaches the predetermined value. The receiving means increases the predetermined value when the power signal is turned off, on, off, and on within a predetermined period after the timer module reaches the predetermined value.

A controllable light fixture comprises a first electrical connector, a receiver module, an electronic switch, and a second electrical connector. The first electrical connector receives a power signal. The receiver module is powered by the power signal received via the first electrical connector, determines control parameters based upon on/off modulation of the power signal, and selectively generates a control signal based upon the control parameters while the power signal is on. The electronic switch outputs an output power signal and reduces the output power signal based on the control signal. The second electrical connector receives a light bulb and provides the output power signal to the light bulb.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiver module determines the control parameters after the on/off modulation indicates a programming initiation sequence. The programming initiation sequence comprises a predetermined on/off sequence performed within a predetermined period of time. The electronic switch reduces the output power signal to approximately zero when the control signal is received. The electronic switch reduces the output power signal to a dimmed value when the control signal is received. The dimmed value is less than the power signal.

In still other features, the receiver module includes a power line carrier receiver module that receives data via the power signal, that is associated with a first address, and that accepts commands addressed to one of the first address and a global address. The control parameters include the first address and the receiver module generates the control signal based upon the data. The power line carrier receiver module performs an operation based upon the on/off modulation. The operation is at least one of a reset address operation, an update address operation, a broadcast connection operation, and a transmit address operation.

In other features, the receiver module further comprises a timing module that begins counting after the power signal is received. The control parameters include a predetermined value. The receiver module generates the control signal when the timing module reaches the predetermined value. The receiver module sets the predetermined value based on a duration that the power signal is on after a programming mode is initiated. The receiver module decreases the predetermined value when the power signal is turned off before the timer module reaches the predetermined value.

In further features, the receiver module increases the predetermined value when the power signal is turned off then on within a predetermined period after the timer module reaches the predetermined value. The receiver module decreases the predetermined value when the power signal is turned off, on, and off within a predetermined period, and before the timer module reaches the predetermined value. The receiver module increases the predetermined value when the power signal is turned off, on, off, and on within a predetermined period after the timer module reaches the predetermined value. The electrical connector comprises conducting female threads and a conducting contact.

A method comprises receiving a power signal at a light fixture; monitoring on/off modulation of the power signal; determining control parameters based upon the on/off modulation; generating a control signal based upon the control parameters while the power signal is on; providing a switchable power signal to a light bulb; and reducing the switchable power signal based upon the control signal.

In other features, the monitoring comprises counting one of power signal presence and power signal absence over a predetermined period of time. The monitoring comprises collecting binary data at periodic sampling intervals, wherein a first binary state corresponds to power signal presence and a second binary state corresponds to power signal absence. The monitoring comprises collecting binary data by measuring periods of one of power signal presence and power signal absence, wherein a first binary state corresponds to periods shorter than a predetermined length and a second binary state corresponds to periods longer than the predetermined length.

In further features, the method further comprises detecting a programming initiation sequence from the on/off modulation before performing the determining. The programming initiation sequence comprises a predetermined on/off sequence detected within a predetermined period of time. The reducing includes reducing the output power signal to one of a dimmed value and an off value when the control signal is received. The method further comprises receiving data superimposed on the power signal; decoding the data into commands; selecting ones of the commands addressed to one of a first address and a global address, where the control parameters include the first address; and generating the control signal based upon the ones of the commands.

In still other features, the method further comprises performing a power line carrier operation based upon the on/off modulation. The operation is at least one of a reset address operation, an update address operation, a broadcast connection operation, and a transmit address operation. The method further comprises beginning timing a first period after the power signal is received. The control parameters include the first period. The generating the control signal is performed when the first period elapses.

In other features, the method further comprises setting the first period based on a duration that the power signal is on after a programming mode is initiated. The method further comprises decreasing the first period when the power signal is turned off before the first period elapses. The method further comprises increasing the first period when the power signal is turned off then on within a predetermined period after the first period elapses. The method further comprises decreasing the first period when the power signal is turned off, on, and off within a predetermined period and before the first period elapses. The method further comprises increasing the first period when the power signal is turned off, on, off, and on within a predetermined period after the reducing has been performed.

A controllable light fixture comprises first electrical connection means for receiving a power signal; receiving means for determining control parameters based upon on/off modulation of the power signal and for generating a control signal based upon the control parameters while the power signal is on, wherein the receiving means is powered by the power signal received via the electrical connection means; electronic switching means for outputting an output power signal and for reducing the output power signal based upon the control signal; and second electrical connection means for receiving a light bulb and for providing the output power signal to the light bulb.

In other features, the on/off modulation comprises a count over a predetermined period of time of one of power signal presence and power signal absence. The on/off modulation comprises binary data collected at periodic sampling intervals, wherein a first binary state corresponds to power signal presence and a second binary state corresponds to power signal absence. The on/off modulation comprises binary data determined by periods of one of power signal presence and power signal absence, wherein a first binary state corresponds to periods shorter than a predetermined length and a second binary state corresponds to periods longer than the predetermined length.

In further features, the receiving means determines the control parameters after the on/off modulation indicates a programming initiation sequence. The programming initiation sequence comprises a predetermined on/off sequence performed within a predetermined period of time. The electronic switching means reduces the output power signal to approximately zero when the control signal is received. The electronic switching means reduces the output power signal to a dimmed value when the control signal is received. The dimmed value is less than the power signal.

In still other features, the receiving means includes power line carrier receiving means for receiving data via the power signal and for accepting commands addressed to one of a first address and a global address. The control parameters include the first address and the receiving means generates the control signal based upon the data. The power line carrier receiving means performs an operation based upon the on/off modulation. The operation is at least one of a reset address operation, an update address operation, a broadcast connection operation, and a transmit address operation.

In other features, the receiving means further comprises timing means for counting after the power signal is received. The control parameters include a predetermined value. The receiving means generates the control signal when the timing means reaches the predetermined value. The receiving means sets the predetermined value based on a duration that the power signal is on after a programming mode is initiated. The receiving means decreases the predetermined value when the power signal is turned off before the timer module reaches the predetermined value.

In further features, the receiving means increases the predetermined value when the power signal is turned off then on within a predetermined period after the timer module reaches the predetermined value. The receiving means decreases the predetermined value when the power signal is turned off, on, and off within a predetermined period, and before the timer module reaches the predetermined value. The receiving means increases the predetermined value when the power signal is turned off, on, off, and on within a predetermined period after the timer module reaches the predetermined value.

A controllable light bulb comprises an electrical connector; a receiver module; an electronic switch; a translucent casing; and a light producing element. The electrical connector receives a power signal. The receiver module is powered by the power signal received via the electrical connector and selectively generates a control signal while the power signal is on. The electronic switch outputs an output power signal and reduces the output power signal based on the control signal. The translucent casing encases the light producing element. The light producing element receives the output power signal.

In other features, the electronic switch reduces the output power signal to one of a dimmed value and an off value when the control signal is received. The receiver module includes a timing module that begins counting after the power signal is received. The receiver module generates the control signal when the timing module reaches a predetermined value. The predetermined value is set at time of manufacturing. The predetermined value is set via a user input.

In further features, the user input comprises dip switches. The receiver module includes read-only memory (ROM) that provides the predetermined value. The receiver module decreases the predetermined value when the power signal is turned off before the timing module reaches the predetermined value. The receiver module increases the predetermined value when the power signal is turned off then on within a predetermined period after the timing module reaches the predetermined value.

In still other features, the receiver module decreases the predetermined value when the power signal is turned off, on, and off within a predetermined period and before the timing module reaches the predetermined value. The receiver module increases the predetermined value when the power signal is turned off, on, off, and on within a predetermined period after the timing module reaches the predetermined value.

In other features, the receiver module includes a power line carrier receiver module that receives data superimposed on the power signal, and that generates the control signal based upon the data. The power line carrier receiver module generates the control signal when the data indicates a light off command. The power line carrier receiver module is associated with a first address and accepts commands addressed to one of the first address and a global address. The first address is set at time of manufacture. The first address is set via a user input.

In further features, the user input comprises dip switches. The receiver module includes read-only memory (ROM) that provides the first address. The receiver module includes a power line carrier transmitter and instructs the power line carrier transmitter to superimpose the first address on the power signal based upon a sequence of on/off modulation of the power signal. The electrical connector comprises conducting male threads and a conducting tip. The light producing element comprises a metallic filament.

A method comprises receiving a power signal at a light bulb; outputting an output power signal to a light producing element; selectively generating a control signal while the power signal is on; and reducing the output power signal based on the control signal.

In other features, the reducing includes reducing the output power signal to one of a dimmed value and an off value when the control signal is received. The method further comprises beginning timing a first period when the power signal is received and generating the control signal when the first period elapses. The predetermined value is set at time of manufacturing of the light bulb.

In further features, the predetermined value is set via a user input. The method further comprises decreasing the predetermined value when the power signal is turned off before the first period elapses. The method further comprises increasing the predetermined value when the power signal is turned off then on within a predetermined period after the first period elapses.

In still other features, the method further comprises decreasing the predetermined value when the power signal is turned off, on, and off within a predetermined period and before the first period elapses. The method further comprises increasing the predetermined value when the power signal is turned off, on, off, and on within a predetermined period after the first period elapses. The method further comprises receiving data superimposed on the power signal. The selectively generating generates the control signal based upon the data.

In other features, the selectively generating generates the control signal when the data indicates a light off command. The method further comprises accepting commands addressed to one of a first address and a global address. The first address is set at time of manufacture of the light bulb. The first address is set via a user input. The method further comprises superimposing the first address on the power signal based upon a sequence of on/off modulation of the power signal.

A controllable light bulb comprises electrical connection means for receiving a power signal; receiving means for selectively generating a control signal while the power signal is on, wherein the receiving means is powered by the power signal received via the electrical connection means; electronic switching means for outputting an output power signal and for reducing the output power signal based on the control signal; light producing means for producing light and for receiving the output power signal; and translucent casing means for enclosing the light producing means.

In other features, the electronic switching means reduces the output power signal to one of a dimmed value and an off value when the control signal is received. The receiving means includes timing means for counting after the power signal is received. The receiving means generates the control signal when the timing means reaches a predetermined value. The predetermined value is set at time of manufacturing.

In further features, the predetermined value is set via a user input. The receiving means includes read-only memory means for providing the predetermined value. The receiving means decreases the predetermined value when the power signal is turned off before the timing means reaches the predetermined value. The receiving means increases the predetermined value when the power signal is turned off then on within a predetermined period after the timing means reaches the predetermined value.

In still other features, the receiving means decreases the predetermined value when the power signal is turned off, on, and off within a predetermined period and before the timing means reaches the predetermined value. The receiving means increases the predetermined value when the power signal is turned off, on, off, and on within a predetermined period after the timing means reaches the predetermined value. The receiving means includes power line carrier receiving means for receiving data superimposed on the power signal and for generating the control signal based upon the data.

In other features, the power line carrier receiving means generates the control signal when the data indicates a light off command. The power line carrier receiving means is associated with a first address and accepts commands addressed to one of the first address and a global address. The first address is set at time of manufacture. The first address is set via a user input. The receiving means includes read-only memory (ROM) that provides the first address. The receiving means includes power line carrier transmitting means for superimposing the first address on the power signal based upon a sequence of on/off modulation of the power signal.

A master controller comprises a control module and a missing pulse transmitter. The control module generates control data for a controllable device that regulates power consumption of a load. The missing pulse transmitter receives a periodic power signal, transmits an output power signal based on the periodic power signal to the controllable device, and encodes the control data in the output power signal by selectively reducing at least one of a signal amplitude and a power level of the output power signal between zero crossings of the periodic power signal.

The missing pulse transmitter comprises a switch including a control terminal that communicates with the control module and a first terminal that receives the periodic power signal. The switch comprises a triac. The switch outputs approximately zero power in the output power signal between the zero crossings. The master controller further comprises a user interface including M inputs, wherein M is an integer greater than one; and a parameter control module that stores M control parameters corresponding to the M inputs, wherein when one of the M inputs is actuated, the control module generates the control data based on a corresponding one of the M control parameters.

The master controller further comprises a power line interface that receives data superimposed on the periodic power signal. The control module generates the control data based on the data from the power line interface. The master controller further comprises a wireless interface that receives data. The control module generates the control data based on the data from the wireless interface.

The master controller further comprises a receiver that detects current consumed by the controllable device and that decodes the current consumption as data received from the controllable device. A system comprises the master controller and further comprises the controllable device. The controllable device further comprises a missing pulse receiver that receives the output power signal and that decodes the control data in the output power signal by detecting a decrease in at least one of the signal amplitude and the power level of the output power signal between zero crossings of the output power signal.

The controllable device further comprises a control module that stores the control data and that generates a control signal based on the control data; and a switch that adjusts a load power signal for the load based on the output power signal and the control signal. The switch includes a control terminal that receives the control signal and a first terminal that receives the output power signal. The switch sets the load power signal to one of a dimmed value, an on value, and an off value. The missing pulse receiver compares the at least one of the signal amplitude and the power level between the zero crossings to a predetermined value.

The control module includes a timing module. The control data includes at least one timing period. The control signal is based on the at least one timing period. The controllable device further comprises a parameter storage module that communicates with the control module and that stores P control pairs, each including a power level value and a timer value, wherein P is an integer greater than zero. The control signal is based on one of the P control pairs and then is based on another of the P control pairs after the timer value associated with the one of the P control pairs expires.

A method comprises generating control data for a controllable device that regulates power consumption of a load; receiving a periodic power signal; transmitting an output power signal based on the periodic power signal to the controllable device; and encoding the control data in the output power signal by selectively reducing at least one of a signal amplitude and a power level of the output power signal between zero crossings of the periodic power signal.

The method further comprises selectively reducing the output power signal to approximately zero power between the zero crossings. The method further comprises storing M control parameters corresponding to M inputs and generating the control data based on a corresponding one of the M control parameters when one of the M inputs is actuated. The method further comprises receiving data superimposed on the periodic power signal and generating the control data based on the superimposed data.

The method further comprises wirelessly receiving data and generating the control data based on the wirelessly received data. The method further comprises detecting current consumed by the controllable device and decoding the current consumption as data received from the controllable device. The method further comprises receiving the output power signal and decoding the control data in the output power signal by detecting a decrease in at least one of the signal amplitude and the power level of the output power signal between zero crossings of the output power signal.

The method further comprises generating a control signal based on the control data and adjusting a load power signal for the load based on the output power signal and the control signal. The method further comprises setting the load power signal to one of a dimmed value, an on value, and an off value. The method further comprises comparing the at least one of the signal amplitude and the power level, between the zero crossings to a predetermined value.

The method further comprises timing at least one period based on the control data and generating the control signal based on the at least one period. The method further comprises storing P control pairs, each including a power level value and a timer value, wherein P is an integer greater than zero. The method further comprises generating the control signal based on one of the P control pairs and generating the control signal based on another of the P control pairs after the timer value associated with the one of the P control pairs expires.

A master controller comprises control means for generating control data for a controllable device that regulates power consumption of a load; and missing pulse transmitting means for receiving a periodic power signal, that transmits an output power signal based on the periodic power signal to the controllable device, and for encoding the control data in the output power signal by selectively reducing at least one of a signal amplitude and a power level of the output power signal between zero crossings of the periodic power signal.

The missing pulse transmitting means comprises a switch including a control terminal that communicates with the control means and a first terminal that receives the periodic power signal. The switch comprises a triac. The switch outputs approximately zero power in the output power signal between the zero crossings. The master controller further comprises user interface means for receiving one of M inputs from a user, wherein M is an integer greater than one; and parameter storage means for storing M control parameters corresponding to the M inputs, wherein when one of the M inputs is actuated, the control means generates the control data based on a corresponding one of the M control parameters.

The master controller further comprises power line interfacing means for receiving data superimposed on the periodic power signal. The control means generates the control data based on the data from the power line interfacing means. The master controller further comprises wireless interfacing means for receiving data wirelessly. The control means generates the control data based on the wirelessly received data.

The master controller further comprises receiving means for detecting current consumed by the controllable device and for decoding the current consumption as data received from the controllable device. A system comprises the master controller and further comprises the controllable device. The controllable device further comprises missing pulse receiving means for receiving the output power signal and for decoding the control data in the output power signal by detecting a decrease in at least one of the signal amplitude and the power level of the output power signal between zero crossings of the output power signal.

The controllable device further comprises control means for storing the control data and for generating a control signal based on the control data; and switching means for adjusting a load power signal for the load based on the output power signal and the control signal. The switching means includes a control terminal that receives the control signal and a first terminal that receives the output power signal. The switching means sets the load power signal to one of a dimmed value, an on value, and an off value. The missing pulse receiving means compares the at least one of the signal amplitude and the power level between the zero crossings to a predetermined value.

The control means includes timing means for timing at least one period. The control data includes the at least one timing period. The control signal is based on the timing means. The controllable device further comprises parameter storage means for communicating with the control means and for storing P control pairs, each including a power level value and a timer value, wherein P is an integer greater than zero. The control signal is based on one of the P pairs and then is based on another of the P pairs after the timer value associated with the one of the P pairs expires.

A controllable device comprises a missing pulse receiver that receives a first power signal and that decodes control data in the first power signal by detecting a decrease in at least one of a signal amplitude and a power level of the first power signal between zero crossings of the first power signal; a control module that stores the control data and that generates a control signal based on the control data; and a switch that adjusts a load power signal for a load based on the first power signal and the control signal.

The switch includes a control terminal that receives the control signal and a first terminal that receives the first power signal. The missing pulse receiver compares the at least one of the signal amplitude and the power level between the zero crossings to a predetermined value. The switch sets the load power signal to one of a dimmed value, an on value, and an off value. The control module includes a timing module. The control data includes a timing period. The control signal is based on the timing period. The controllable device further comprises a parameter storage module that communicates with the control module and that stores P control pairs, each including a power level value and a timer value, wherein P is an integer greater than one.

The P control pairs are based on the control data. The control signal is based on one of the P control pairs and then is based on another of the P control pairs after the timer value associated with the one of the P control pairs expires. The at least one of the P control pairs in the parameter storage module is selected based on the control data. A system comprises the controllable device and further comprises a master controller. The master controller comprises a control module that generates the control data for the controllable device; and a missing pulse transmitter that receives a periodic power signal, that transmits the first power signal based on the periodic power signal to the controllable device, and that encodes the control data in the first power signal by selectively reducing the at least one of the signal amplitude and the power level of the first power signal between zero crossings of the periodic power signal.

The missing pulse transmitter includes a switch including a control terminal that communicates with the control module and a first terminal that receives the periodic power signal. The switch comprises a triac. The switch outputs approximately zero power in the first power signal between the zero crossings. The master controller further comprises a user interface including M inputs, wherein M is an integer greater than one; and a parameter control module that stores M control parameters corresponding to the M inputs, wherein when one of the M inputs is actuated, the control module generates the control data based on a corresponding one of the M control parameters.

The master controller further comprises a power line interface that receives data superimposed on the periodic power signal. The control module generates the control data based on the data from the power line interface. The master controller further comprises a wireless interface that receives data. The control module generates the control data based on the data from the wireless interface. The master controller further comprises a receiver that detects current consumed by the controllable device and that decodes the current consumption as data for the master controller from the controllable device.

A method comprises receiving a first power signal; decoding control data in the first power signal by detecting a decrease in at least one of a signal amplitude and a power level of the first power signal between zero crossings of the first power signal; generating a control signal based on the control data; and adjusting a load power signal for a load based on the first power signal and the control signal.

The method further comprises comparing the at least one of the signal amplitude and the power level between the zero crossings to a predetermined value. The method further comprises setting the load power signal to one of a dimmed value, an on value, and an off value. The method further comprises timing at least one period based on the control data and generating the control signal based on the at least one period. The method further comprises storing P control pairs, each including a power level value and a timer value, wherein P is an integer greater than one.

The P control pairs are based on the control data. The method further comprises generating the control signal based on one of the P control pairs and generating the control signal based on another of the P control pairs after the timer value associated with the one of the P control pairs expires. The method further comprises selecting the one of the P control pairs in the parameter storage module based on the control data.

The method further comprises receiving a periodic power signal transmitting the first power signal based on the periodic power signal and encoding the control data in the first power signal by selectively reducing the at least one of the signal amplitude and the power level of the first power signal between zero crossings of the periodic power signal. The method further comprises reducing the first power signal to approximately zero power between the zero crossings. The method further comprises storing M control parameters corresponding to M inputs and generating the control data based on a corresponding one of the M control parameters when one of the M inputs is actuated.

The method further comprises receiving data superimposed on the periodic power signal and generating the control data based on the superimposed data. The method further comprises wirelessly receiving data and generating the control data based on the wirelessly received data. The method further comprises detecting current consumed by the controllable device and decoding the current consumption as data received from the controllable device.

A controllable device comprises missing pulse receiving means for receiving a first power signal and for decoding control data in the first power signal by detecting a decrease in at least one of a signal amplitude and a power level of the first power signal between zero crossings of the first power signal; control means for storing the control data and for generating a control signal based on the control data; and switching means for adjusting a load power signal for a load based on the first power signal and the control signal.

The switching means includes a control terminal that receives the control signal and a first terminal that receives the first power signal. The missing pulse receiving means compares the at least one of the signal amplitude and the power level between the zero crossings to a predetermined value. The switching means sets the load power signal to one of a dimmed value, an on value, and an off value. The control means includes timing means for timing at least one period. The control data includes the at least one period. The control signal is based on the timing period.

The controllable device further comprises parameter storage means for communicating with the control means and for storing P control pairs, each including a power level value and a timer value, wherein P is an integer greater than one. The P control pairs are based on the control data. The control signal is based on one of the P control pairs and then is based on another of the P control pairs after the timer value associated with the one of the P control pairs expires.

The at least one of the P control pairs in the parameter storage means is selected based on the control data. A system comprises the controllable device and further comprises a master controller. The master controller comprises control means for generating the control data for the controllable device; and missing pulse transmitting means for receiving a periodic power signal, for transmitting the first power signal based on the periodic power signal to the controllable device, and for encoding the control data in the first power signal by selectively reducing the at least one of the signal amplitude and the power level of the first power signal between zero crossings of the periodic power signal.

The missing pulse transmitting means includes a switch including a control terminal that communicates with the control means and a first terminal that receives the periodic power signal. The switch comprises a triac. The switch outputs approximately zero power in the first power signal between the zero crossings. The master controller further comprises user interfacing means for receiving one of M inputs, wherein M is an integer greater than one; and parameter control means for storing M control parameters corresponding to the M inputs, wherein when one of the M inputs is actuated, the control means generates the control data based on a corresponding one of the M control parameters.

The master controller further comprises power line interfacing means for receiving data superimposed on the periodic power signal. The control means generates the control data based on the data from the power line interfacing means. The master controller further comprises wireless interfacing means for receiving data. The control means generates the control data based on the data from the wireless interfacing means. The master controller further comprises receiving means for detecting current consumed by the controllable device and for decoding the current consumption as data for the master controller from the controllable device.

An installation programmer comprises a control module that generates programming data for a controllable device that regulates power consumption of a load, the programming data including at least one of timer values and power level values; and a missing pulse transmitter that receives a periodic power signal, that transmits an output power signal based on the periodic power signal to the controllable device, and that encodes the programming data in the output power signal by selectively reducing at least one of a signal amplitude and a power level of the output power signal between zero crossings of the periodic power signal.

The missing pulse transmitter comprises a switch including a control terminal that communicates with the control module and a first terminal that receives the periodic power signal. The switch comprises a triac. The switch outputs approximately zero power in the output power signal between the zero crossings. The installation programmer further comprises a user interface including M inputs, wherein M is an integer greater than one; and a parameter control module that stores M programming parameters corresponding to the M inputs, wherein when one of the M inputs is actuated, the control module generates the programming data based on a corresponding one of the M programming parameters.

The installation programmer further comprises a receiver that detects current consumed by the controllable device and that decodes the current consumption as data received from the controllable device. The installation programmer further comprises nonvolatile memory. The control module stores the data received from the controllable device in the nonvolatile memory, and selectively generates the programming data based on the data stored in the nonvolatile memory.

The programming data includes at least one pair of a timer value and a power level value. A system comprises the installation programmer and further comprises the controllable device. The controllable device further comprises a missing pulse receiver that receives the output power signal and that decodes the programming data in the output power signal by detecting a decrease in at least one of the signal amplitude and the power level of the output power signal between zero crossings of the output power signal.

The controllable device further comprises a control module that stores the programming data; that generates control data based on the programming data, and that generates a control signal based on the control data; and a switch that adjusts a load power signal for the load based on the output power signal and the control signal. The switch includes a control terminal that receives the control signal and a first terminal that receives the output power signal. The switch adjusts the output power signal to one of a dimmed value, an on value, and an off value.

The missing pulse receiver compares the signal amplitude between the zero crossings to a predetermined signal amplitude. The missing pulse receiver compares the power level between the zero crossings to a predetermined power level. The control module includes a timing module. The programming data includes at least one timing period. The control signal is based on the at least one timing period.

The controllable device further comprises a parameter storage module that communicates with the control module and that stores P control pairs, each including a power level value and a timer value, wherein P is an integer greater than zero. The control signal is based on one of the P pairs and then is based on another of the P pairs after the timer value associated with the one of the P pairs expires.

A method comprises generating programming data for a controllable device that regulates power consumption of a load, the programming data including at least one of timer values and power level values; receiving a periodic power signal; transmitting an output power signal based on the periodic power signal to the controllable device; and encoding the programming data in the output power signal by selectively reducing at least one of a signal amplitude and a power level of the output power signal between zero crossings of the periodic power signal.

The method further comprises reducing the output power signal to approximately zero power between the zero crossings. The method further comprises storing M control parameters corresponding to M inputs and generating the programming data based on a corresponding one of the M control parameters when one of the M inputs is actuated. The method further comprises detecting current consumed by the controllable device and decoding the current consumption as data received from the controllable device.

The method further comprises storing the data received from the controllable device in nonvolatile memory and selectively generating the programming data based on the data received from the controllable device. The programming data includes at least one pair of a timer value and a power level value. The method further comprises receiving the output power signal and decoding the programming data in the output power signal by detecting a decrease in at least one of the signal amplitude and the power level of the output power signal between zero crossings of the output power signal.

The method further comprises generating control data based on the programming data generating a control signal based on the control data and adjusting a load power signal for the load based on the output power signal and the control signal. The method further comprises adjusting the load power signal to one of a dimmed value, an on value, and an off value. The method further comprises timing at least one period based on the control data and generating the control signal based on the at least one period.

The method further comprises comparing the at least one of the signal amplitude and the power level between the zero crossings to a predetermined value. The method further comprises storing P control pairs, each including a power level value and a timer value, wherein P is an integer greater than zero. The method further comprises generating the control signal based on one of the P control pairs and generating the control signal based on another of the P control pairs after the timer value associated with the one of the P control pairs expires.

An installation programmer comprises control means for generating programming data for a controllable device that regulates power consumption of a load, the programming data including at least one of timer values and power level values; and missing pulse transmitting means for receiving a periodic power signal, for transmitting an output power signal based on the periodic power signal to the controllable device, and for encoding the programming data in the output power signal by selectively reducing at least one of a signal amplitude and a power level of the output power signal between zero crossings of the periodic power signal.

The missing pulse transmitting means comprises a switch including a control terminal that communicates with the control means and a first terminal that receives the periodic power signal. The switch comprises a triac. The switch outputs approximately zero power in the output power signal between the zero crossings. The installation programmer further comprises user interfacing means for receiving one of M inputs, wherein M is an integer greater than one; and parameter control means for storing M programming parameters corresponding to the M inputs, wherein when one of the M inputs is actuated, the control means generates the programming data based on a corresponding one of the M programming parameters.

The installation programmer further comprises receiving means for detecting current consumed by the controllable device and for decoding the current consumption as data received from the controllable device. The installation programmer further comprises nonvolatile memory. The control means stores the data received from the controllable device in the nonvolatile memory, and selectively generates the programming data based on the data stored in the nonvolatile memory. The programming data includes at least one pair of a timer value and a power level value.

A system comprises the installation programmer and further comprises the controllable device. The controllable device further comprises missing pulse receiving means for receiving the output power signal and for decoding the programming data in the output power signal by detecting a decrease in at least one of the signal amplitude and the power level of the output power signal between zero crossings of the output power signal.

The controllable device further comprises control means for storing the programming data; for generating control data based on the programming data, and for generating a control signal based on the control data; and switching means for adjusting a load power signal for the load based on the output power signal and the control signal. The switching means includes a control terminal that receives the control signal and a first terminal that receives the output power signal. The switching means adjusts the output power signal to one of a dimmed value, an on value, and an off value.

The missing pulse receiving means compares the signal amplitude between the zero crossings to a predetermined signal amplitude. The missing pulse receiving means compares the power level between the zero crossings to a predetermined power level. The control means includes timing means for timing at least one timing period. The programming data includes the at least one timing period. The control signal is based on the timing means.

The controllable device further comprises parameter storage means for communicating with the control means and for storing P control pairs, each including a power level value and a timer value, wherein P is an integer greater than zero. The control signal is based on one of the P pairs and then is based on another of the P pairs after the timer value associated with the one of the P pairs expires.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2-5 are functional block diagrams of exemplary electric lighting systems according to the principles of the present disclosure;

FIG. 6 is a functional block diagram of an exemplary controllable bulb according to the principles of the present disclosure;

FIG. 21 is a group of exemplary tables indicating exemplary power provision presence and absence sequences and associated instructions;

FIGS. 31A-D illustrate missing pulse transmission according to the principles of the present disclosure;

FIG. 32 illustrates an exemplary user interface according to the principles of the present disclosure;

FIGS. 33A-C are functional block diagrams of exemplary parameter control modules according to the principles of the present disclosure;

DETAILED DESCRIPTION

Figure 1:
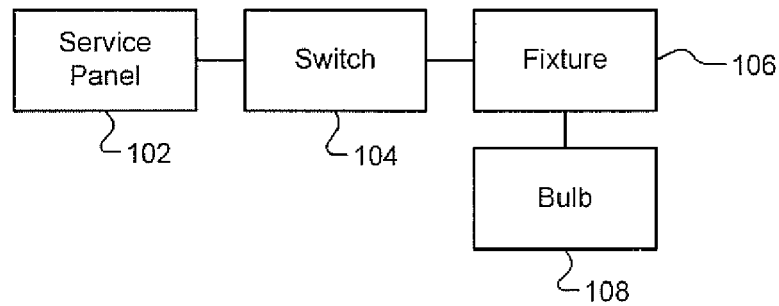
FIG. 1 is a functional block diagram of a lighting system according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
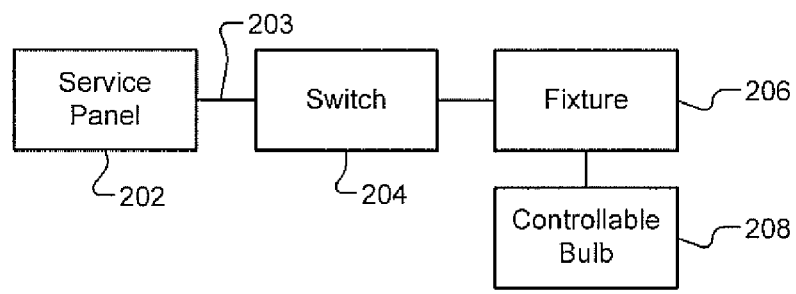

Referring now to FIG. 2, a functional block diagram of an exemplary electric lighting system is presented. A service panel 202 communicates via an electrical distribution line 203 with a switch 204. The switch 204 may be a wall switch, a toggle switch, a rocker switch, a dimmer switch, or any other suitable switch. The switch 204 controls flow of power to a light fixture 206. A controllable bulb 208 communicates with the light fixture 206.

The controllable bulb 208 may include a receiver for receiving control signals. The control signals may include wireline signals received via the electrical distribution line 203 and/or wireless signals received via radio frequency (RE) broadcasts. These control signals may instruct the controllable bulb 208 to decrease or increase light output.

In various implementations, the controllable bulb 208 may include a timer that turns off a light after a predetermined period of time. The duration of the timer may be programmed at the time of manufacturing, set at installation time, and/or modified by the user once installed. As described in more detail below, the user may modify operation of the timer by transmitting control signals, such as using a power line transmitter and/or a radio frequency (RE) transmitter, and/or by modulating the switch 204.

By using the controllable bulb 208 instead of a standard bulb, the operation of the light fixture 206 can be automated without the need for an electrician to replace the switch 204. The level of automation provided by controllable bulbs may include timed light shut-off, whole-house light shut-off, computer-controlled lighting control, and/or web-accessible lighting control. The principles of the present disclosure work equally well in a configuration containing three-way or four-way switches.

Figure 3:
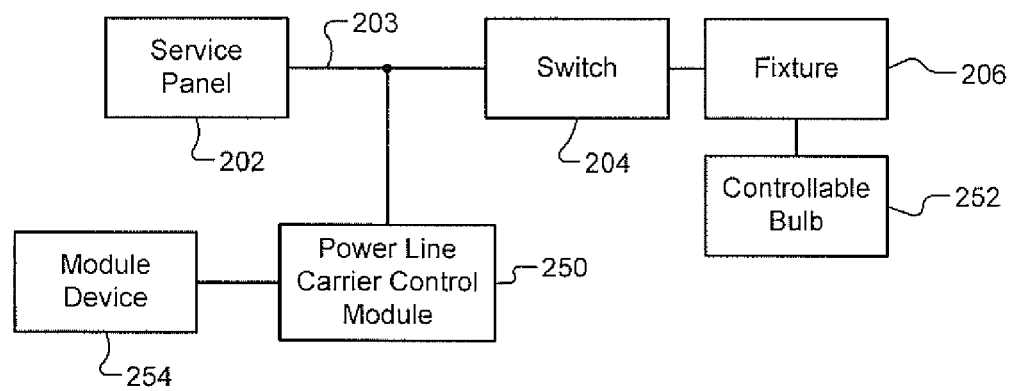

Referring now to FIG. 3, a functional block diagram of another exemplary electric lighting system is presented. A power line carrier control module 250 communicates with the electrical distribution line 203 or with another electrical distribution line (not shown) that is in communication with the service panel 202. The power line carrier control module 250 superimposes control signals onto the electrical distribution line 203. A controllable bulb 252 receives the control signals via the switch 204 and the light fixture 206.

The power line carrier control module 250 may include a user interface, which allows a user to increase or decrease light output from one or more light sources, such as the controllable bulb 252. The power line carrier control module 250 may also communicate with a mobile device 254, such as a laptop computer, a personal digital assistant (PDA), and/or a mobile phone. The mobile device 254 may send lighting commands to the power line carrier control module 250 via wired or wireless networks, such as wired Ethernet, or wireless interfaces such as IEEE 802.11, 802.11a, 802.11b, 802.11g, 802.11h, 802.11n, 802.16, 802.20, and/or Bluetooth.

Referring now to FIG. 4, a functional block diagram of another exemplary electric lighting system is presented. The service panel 202 communicates with the switch 204 via the electrical distribution line 203. The switch 204 communicates with a controllable light fixture 300. A light bulb 302 communicates with the controllable light fixture 300. The controllable light fixture 300 allows control of light output without requiring manual activation of the switch 204.

Once a traditional light fixture is replaced with the controllable light fixture 300, standard light bulbs, such as the light bulb 302, can be used. The light bulb 302 and the controllable bulbs 208 and 252 may include incandescent, halogen, fluorescent, light-emitting diode, and/or other suitable light producing elements.

Referring now to FIG. 5, a functional block diagram of another exemplary electric lighting system is presented. For purposes of clarity, reference numerals from FIG. 2 and FIG. 4 are used to identify similar components. The service panel 202 communicates with the switch 204 via the electrical distribution line 203.

The switch 204 communicates with the light fixture 206. A controllable adapter 350 is installed between the light fixture 206 and the light bulb 302. For example, the controllable adapter 350 may include a male portion that engages the light fixture 206 and a female portion that engages the light bulb 302. Neither the switch 204 nor the light fixture 206 needs to be replaced. In addition, standard light bulbs, such as the light bulb 302, may be used.

Referring now to FIG. 6, a functional block diagram of an exemplary controllable bulb 400 is presented. The controllable bulb 400, which may be used as the controllable bulb 208 of FIG. 2, includes a light producing element 402, a controller 404, and an electronic switch 406. The light producing element 402 may include a filament, such as the filament in a halogen light bulb or an incandescent light bulb. The light producing element 402 may also include a fluorescent light bulb and/or a compact fluorescent light bulb, and may include a built-in ballast.

The light producing element 402 may include one or more light emitting diodes (LEDs). The light producing element 402 and/or other components of the controllable bulb 400 may be enclosed in a translucent casing 408, which may be airtight and may be made from such materials as glass and/or plastic. The controller 404 may communicate power via first and second supply lines or conductors.

For example, the first and second supply lines may provide power and ground, first and second line voltages (such as those in three-phase systems), and/or other suitable supply and/or reference potentials. In various implementations, the controllable bulb 400 may have conducting male threads, which communicate with one of the first and second supply lines, and a conducting tip, which communicates with the other of the first and second supply lines.

The controller 404 generates a control signal for the electronic switch 406, as described in more detail below. Based upon the control signal, the electronic switch 406 selectively allows current from the first supply line to pass to the light producing element 402. Alternately, the electronic switch 406 may be placed on the other side of the light producing element 402, and selectively allow current to flow through the second supply line. In various implementations, the electronic switch 406 may include a power transistor, a triac, a silicon controlled rectifier (SCR), or some other suitable device.

The electronic switch 406 may include dimming functionality. For example, based on the control signal, the electronic switch 406 may reduce the voltage, alter the wave shape, and/or alter the frequency of power provided to the light producing element. The electronic switch 406 may include a switching circuit that switches off during portions of each cycle of an AC power signal to provide dimming. The electronic switch 406 may include a rectifier for producing DC power, and may include a DC-to-DC converter to reduce voltage. The electronic switch 406 may include a wave-shaping module that alters a wave shape of the AC power signal to provide dimming.

The control signal from the controller 404 may include a digital signal that transitions from high to low or from low to high to instruct the electronic switch to prevent current from passing to the light producing element 402. The control signal may include an analog signal corresponding to the amount of dimming to be produced by the electronic switch 406. The analog signal may vary from one of a digital high voltage or a digital low voltage to the other of the digital high and low voltages. One extreme value of the analog signal may correspond to the light producing element 402 being off and the other extreme value may correspond to the light producing element 402 being fully on.

Figure 7:
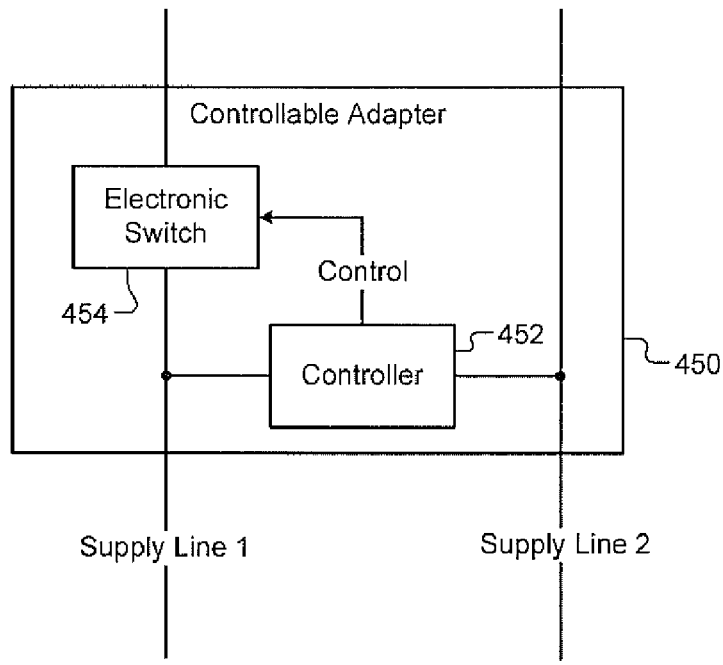
FIG. 7 is a functional block diagram of an exemplary controllable adapter according to the principles of the present disclosure.

Referring now to FIG. 7, a functional block diagram of an exemplary controllable adapter 450 is presented. The controllable adapter 450, which may be used as the controllable adapter 350 of FIG. 5, includes a controller 452 and an electronic switch 454. The controller 452 communicates with first and second supply lines. The controller 452 provides a control signal to the electronic switch 454. The electronic switch 454 selectively interrupts the first supply line based upon the control signal. Signals on the switched first supply line and/or the second supply line are output by the controllable adapter 450 to a light producing element (not shown).

Figure 8:
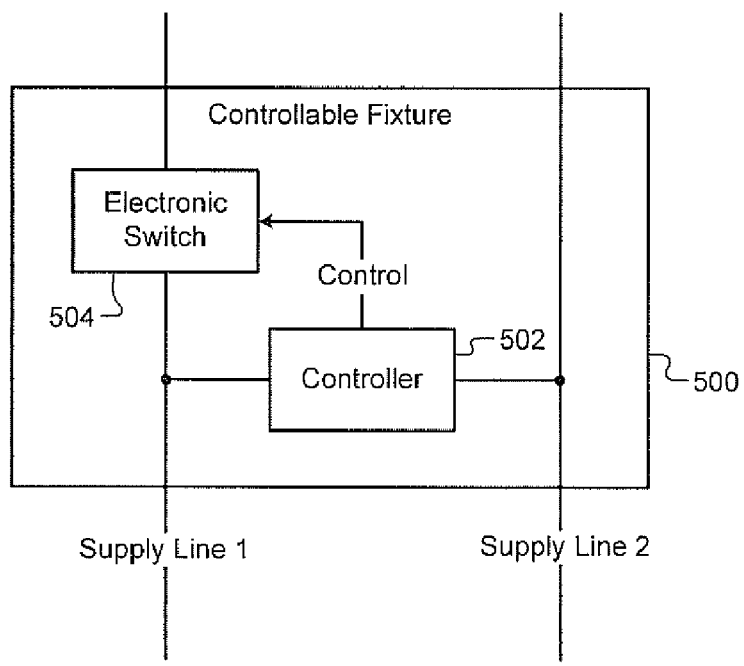
FIG. 8 is a functional block diagram of an exemplary controllable fixture according to the principles of the present disclosure.

Referring now to FIG. 8, a functional block diagram of an exemplary controllable fixture 500 is presented. The controllable fixture 500, which may be used as the controllable light fixture 300 of FIG. 4, includes a controller 502 and an electronic switch 504. The controller 502 may receive power from first and second supply lines. The controller 502 may communicate with the second supply line.

The controller 502 generates a control signal, which is output to the electronic switch 504. Based upon the control signal, the electronic switch 504 selectively interrupts current flowing on the first supply line. The first and/or second supply lines are selectively connected by the controllable fixture 500 to a light bulb (not shown).

Figure 9:
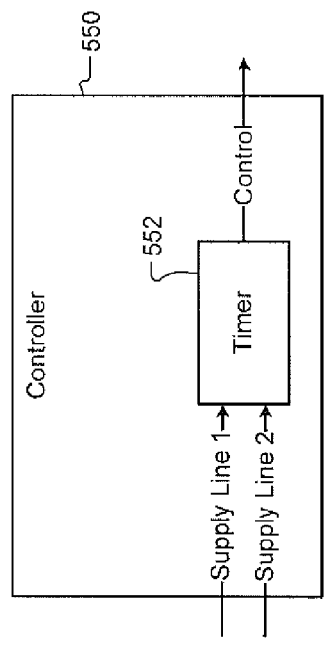
FIGS. 9-18 are functional block diagrams of exemplary controllers according to the principles of the present disclosure.

Referring now to FIGS. 9-18, exemplary controllers are shown, such as those used in the controllable bulb 400, the controllable adapter 450, and the controllable fixture 500 of FIGS. 6-8. In FIG. 9, a functional block diagram of an exemplary controller 550 is presented. The controller 550 includes a timer 552. The timer 552 receives power via first and second supply lines. The timer 552 may include an internal power supply (not shown) to convert the voltage from the first and second supply lines into a voltage appropriate for operating digital logic.

The timer 552 may begin running when it receives power, such as when a manual light switch is turned on. While running, the timer 552 asserts a first control signal directing an electronic switch to remain closed (conducting). The light controlled by the electronic switch remains on. Once the timer reaches a predetermined timer value, the timer 552 asserts a second control signal indicating that the electronic switch should open, which turns the associated light off. The timer 552 may be reset by temporarily removing power, such as by turning the manual light switch off and back on.

Figure 10:
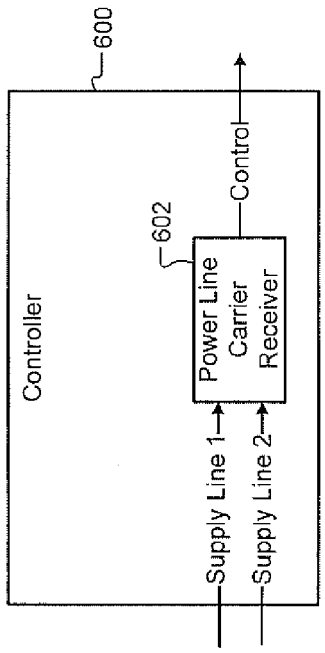

Referring now to FIG. 10, a functional block diagram of another exemplary controller 600 is presented. The controller 600 includes a power line carrier receiver 602, which receives power and control signals via first and second supply lines. Based upon the received control signals, the power line carrier receiver 602 selectively outputs a control signal to open and close an electronic switch.

The received control signals may comprise light on and light off signals, corresponding to output control signals for closing and opening the electronic switch, respectively. In order to communicate with the power line carrier receiver 602, an address may be assigned to the power line carrier receiver 602, such as at the time of manufacture or during installation. The address may be globally unique or may be unique throughout a building so that commands to the controller 600 can be specifically addressed to the controller 600.

The assigned address may be written on the packaging of the controller 600, so that the assigned address can be programmed into a power line carrier control module. The power line carrier control module can then send commands specifically addressed to the controller 600. In various embodiments, the power line carrier receiver 602 may respond to universally-addressed commands, allowing a power line carrier control module to, for instance, turn off all lights in a building.

Figure 11:
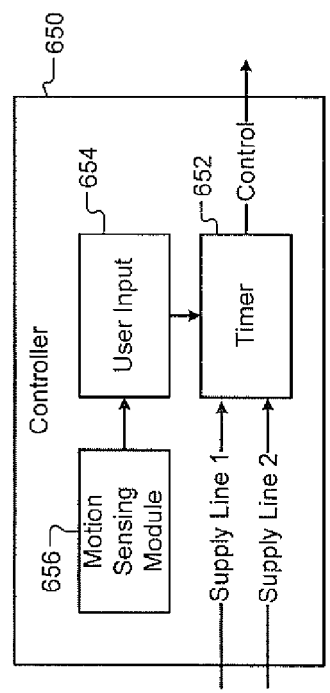

Referring now to FIG. 11, a functional block diagram of still another exemplary controller 650 is presented. The controller 650 includes a timer 652 and a user input device 654. The user input device 654 may include dials, pushbuttons, and/or other devices. The user input device 654 determines a timer value for the timer 652.

The timer 652 asserts a first control signal until the timer value indicated by the user input device 654 is reached. The timer 652 then asserts a second control signal. The first and second control signals direct an electronic switch to close and open, respectively. A light controlled by the electronic switch therefore stays on until the second control signal is received.

The user input device 654 may also include a motion sensing module 656. When motion is sensed prior to the timer 652 reaching the timer value, the user input device 654 may increase the tinier value. The increase may be by a predetermined amount or may be related to the amount of time before the previous timer value would have been reached. If the timer 652 has already reached the timer value, the user input device 654 may respond to sensed motion by resetting the timer 652, thereby turning the light back on.

Figure 12:
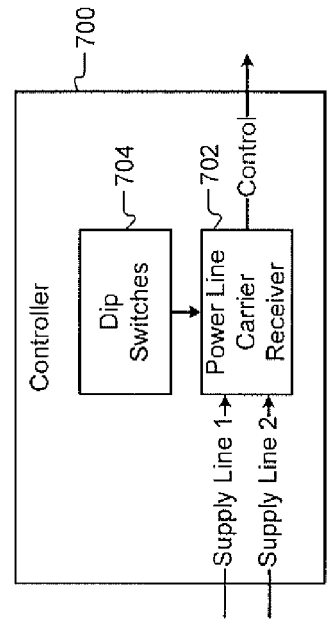

Referring now to FIG. 12, a functional block diagram of yet another exemplary controller 700 is presented. The controller 700 includes a power line carrier receiver 702 and a user input device, such as dip switches 704. The power line carrier receiver 702 receives power and control signals via first and second supply lines.

Based upon received control signals, the power line carrier receiver 702 instructs an electronic switch to open or close. The dip switches 704 determine the assigned address of the power line carrier receiver 702. In this way, each controller 700 in a building may be assigned a different address that allows it to respond to specifically addressed control signals.

Figure 13:
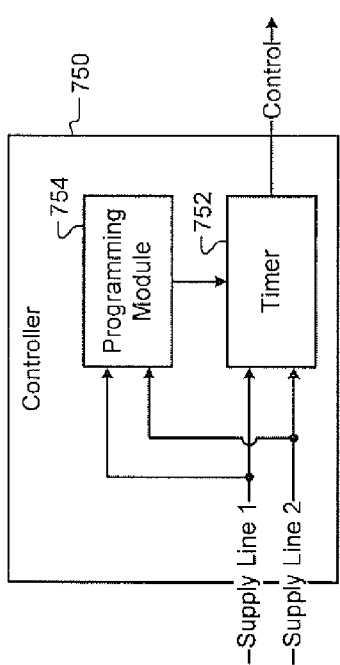

Referring now to FIG. 13, a functional block diagram of another exemplary controller 750 is presented. The controller 750 includes a timer 752 and a programming module 754, which receive power from first and second supply lines. The timer 752 asserts a control signal directing an electronic switch to open once the timer 752 reaches a predetermined timer value.

The predetermined value of the timer 752 may be determined by the programming module 754. The programming module 754 may contain an initial value for the timer 752, which can be replaced by initiating a programming operation. In order to initiate a programming operation, a manual light switch, such as the switch 204 of FIG. 2, may be actuated in a predetermined manner to initiate a programming mode.

For example only, the switch may be turned on and off a predetermined number of times during a predetermined period. The light may be flashed on and off, dimmed, or otherwise modulated to indicate that programming mode has been entered. Once programming mode has been entered, the light switch may be turned on and off, in a manner described in more detail below, to program a predetermined timer value. The programming module 754 outputs the timer value to the timer module 752 and may store the timer value in nonvolatile memory.

Figure 14:
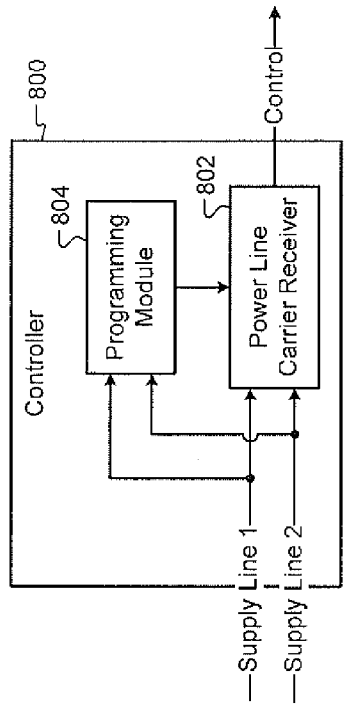

Referring now to FIG. 14, a functional block diagram of another exemplary controller 800 is presented. The controller 800 includes a power line carrier receiver 802 and a programming module 804. The power line carrier receiver 802 receives power and control signals from first and second supply lines. The power line carrier receiver 802 monitors the control signals for commands directed to a specified address.

As with the programming module 754 of FIG. 13, the programming module 804 of FIG. 14 may receive data by monitoring switching of power on the supply lines. Based upon a predetermined pattern of power switching, the programming module 804 may initiate a listen mode. In listen mode, the programming module 804 directs the power line carrier receiver 802 to listen for an address broadcast over the first and second supply lines via power line carrier.

A power line carrier control module may then broadcast a message including an address over the first and second supply lines. The power line carrier receiver 802 can then use the received address as its assigned address, allowing future commands to be addressed specifically to the power line carrier receiver 802. This process can be repeated for other controllers within a building, thereby assigning each a unique address.

After each controller is placed in listen mode, a corresponding unique address can be broadcast. These unique addresses can then be used to individually control the controllers. Alternatively, predetermined patterns of power switching may provide an address in the programming module 804. The power line carrier receiver 802 can then receive this address from the programming module 804 and respond to received commands directed to this address.

Figure 15:
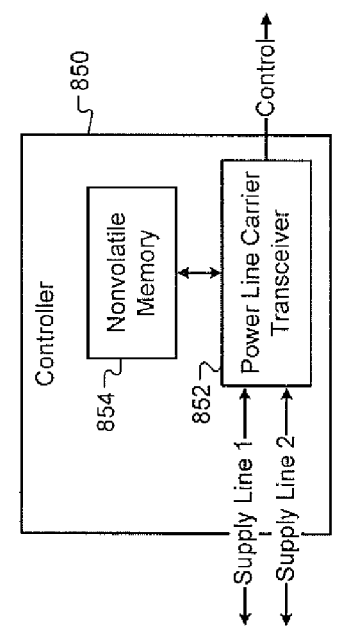

Referring now to FIG. 15, a functional block diagram of yet another exemplary controller 850 is presented. The controller 850 includes a power line carrier transceiver 852 and may include nonvolatile memory 854. The power line carrier transceiver 852 receives power and control signals and transmits control signals via first and second supply lines.

When the power line carrier transceiver 852 first receives power after installation, it may transmit an identification signal via the first and second supply lines. A power line carrier control module (not shown) in communication with the first and second supply lines can receive the identification signal and reply with a unique address. The power line carrier transceiver 852 receives this unique address and may store it in nonvolatile memory 854. The power line carrier transceiver 852 can then respond to messages bearing the unique address.

Alternatively, the power line carrier transceiver 852 may include a preprogrammed unique address. Upon receiving power after installation, the power line carrier transceiver 852 can broadcast this unique preprogrammed address over the first and second supply lines. The power line carrier control module can then use this address to subsequently communicate with the controller 850.

When multiple controllers, such as the controller 850, receive power simultaneously, they may attempt to transmit simultaneously. Collision detection can prevent simultaneous transmission, but the assignment of unique addresses may not be determinate. For this reason, the controllers may need to be powered on and/or programmed sequentially.

Figure 16:
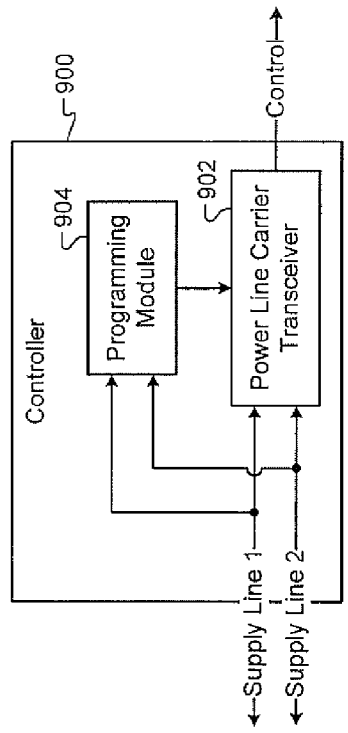

Referring now to FIG. 16, a functional block diagram of another exemplary controller 900 is presented. The controller 900 includes a power line carrier transceiver 902 and a programming module 904. The power line carrier transceiver 902 receives and transmits control signals via first and second supply lines.

The programming module 904 interprets presence and absence of power on the supply lines as instructions. The programming module 904 communicates commands based on these instructions to the power line carrier transceiver 902. The programming module 904 may communicate a set address instruction accompanied by a specified address to the power line carrier transceiver 902. The power line carrier receiver 902 can then respond to commands directed to the specified address.

The programming module 904 may also send a transmit address command to the power line carrier transceiver 902. The address transmitted by the power line carrier transceiver 902 can be received by a power line carrier control module (not shown) in communication with the first and second supply lines. The power line carrier control module can then transmit messages to the power line carrier transceiver 902 using that address.

The programming module 904 may also send a listen command to the power line carrier transceiver 902. The programming module 904 may then begin using the next address received in a broadcast message. The programming module 904 may also send a reset address command to the power line carrier transceiver 902, causing the power line carrier transceiver 902 to reset its address to a factory default.

This factory default may be known to the power line carrier control module, allowing it to communicate with the power line carrier transceiver 902 to perform initial setup. At the end of initial setup, the power line carrier control module may assigning a unique address to the power line carrier transceiver 902.

Figure 17:
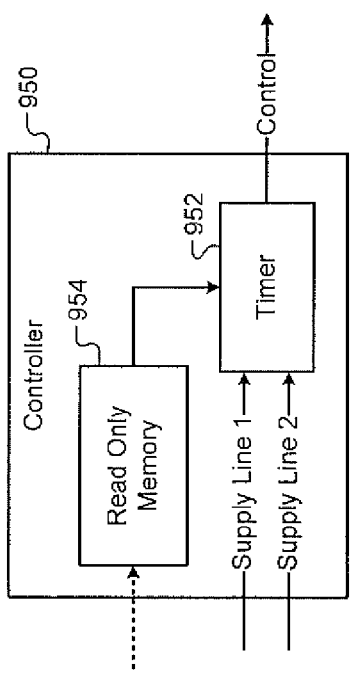

Referring now to FIG. 17, a functional block diagram of another exemplary controller 950 is presented. The controller 950 includes a timer 952 and read only memory (ROM) 954. ROM 954 may be programmed at the time of manufacture or at the time of installation. Once programmed, ROM 954 provides a timer value 952 to the tinier 952. The timer 952 may function similarly to the timer module 752 of FIG. 13.

Figure 18:
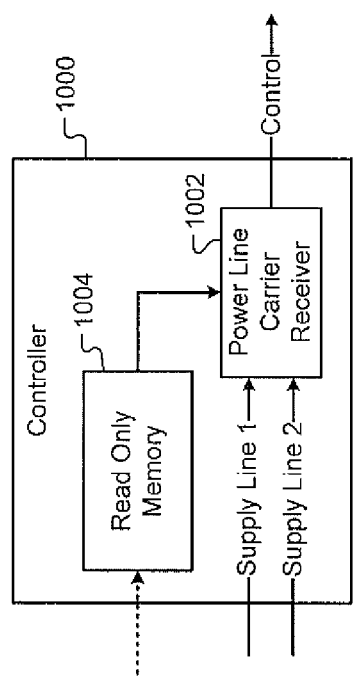

Referring now to FIG. 18, a functional block diagram of yet another exemplary controller 1000 is presented. The controller includes a power line carrier receiver 1002 and read only memory (ROM) 1004. ROM 1004 may be programmed at the time of manufacture or installation, and provides an address to the power line carrier receiver 1002. The power line carrier receiver 1002 responds to control signals bearing the address specified by ROM 1004. Multiple controllers such as the controller 1000 within a building can each have their ROM programmed with a unique address. The power line carrier receiver 1002 may function similarly to the power line carrier receiver 802 of FIG. 14.

Figure 19:
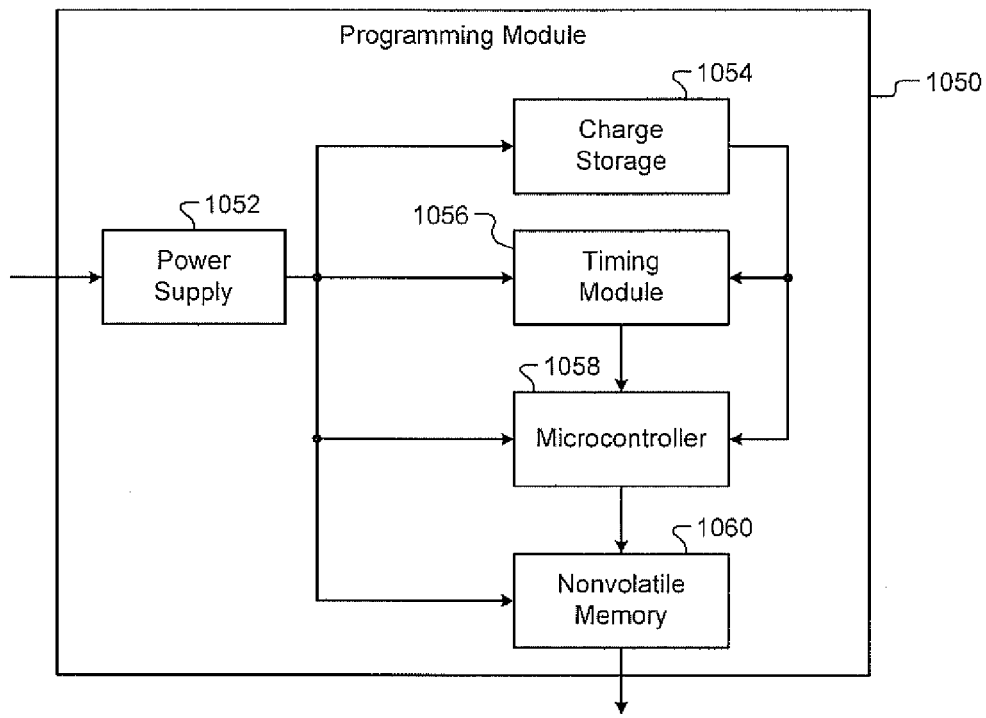
FIGS. 19-20 are functional block diagrams of exemplary programming modules according to the principles of the present disclosure.

Referring now to FIG. 19, a functional block diagram of an exemplary programming module 1050 is presented. The programming module 1050 includes a power supply 1052 that provides power to components of the programming module 1050. The programming module 1050 further includes a timing module 1056, a microcontroller 1058, and nonvolatile memory 1060.

Data is communicated to the programming module 1050 by supplying and removing power using the switch. When power is not being supplied to the programming module 1050, the power supply 1052 can not provide power. The charge storage module 1054 therefore stores electrical energy and provides that electrical energy to the timing module 1056 and the microcontroller 1058 when power is removed. The timing module 1056 may be used to monitor the length of time that power is present and the length of time that power is removed. This information is used to program the operation of the controllable bulb, fixture, or adapter.

The microcontroller 1058 receives power presence and absence times from the timing module 1056 and interprets them as instructions. The charge storage module 1054 stores enough charge to power the timing module 1056 and the microcontroller 1058 for the longest expected duration that the power will be removed during programming.

When power is removed for a long period of time, such as when a light is manually switched off at night, the charge storage module 1054 loses enough charge that the timing module 1056 and the microcontroller 1058 cease operation. This is not problematic, as the timing module 1056 and the microcontroller 1058 need only be active when engaged in programming. The microcontroller 1058 stores programming information in nonvolatile memory 1060 in preparation for power being removed for an extended period.

Figure 20:
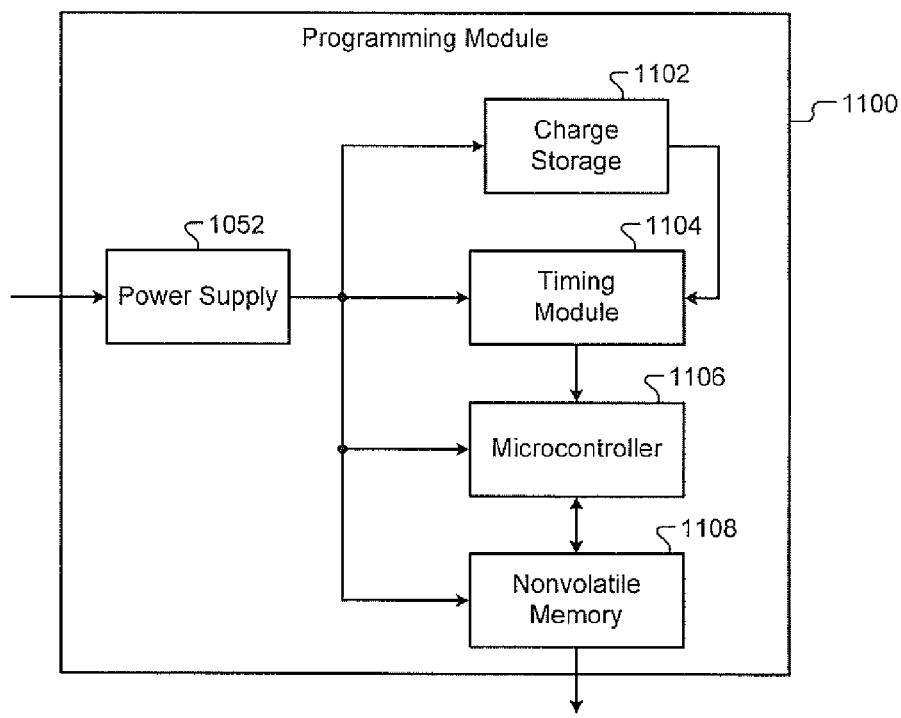

Referring now to FIG. 20, a functional block diagram of another exemplary programming module 1100 is presented. The programming module 1100 includes the power supply 1052, which powers a charge storage module 1102, a timing module 1104, a microcontroller 1106, and nonvolatile memory 1108.

The charge storage module 1102 powers the timing module 1104 when power is removed from the power supply 1052. Once power is restored, the microcontroller 1106 reads the value of the timing module 1104 and stores the value into nonvolatile memory 1108. In this way, the microcontroller 1106 can ascertain when power is turned back on without being powered itself.

In order to determine for how long power was removed, the microcontroller stores a timer value into nonvolatile memory 1108 before power is removed. Because the microcontroller 1106 may not have enough time to record a timer value once power is removed, the microcontroller 1106 may periodically store the timer value while power is present. The approximate length of the power absence can then be determined from the last timer value written to nonvolatile memory 1108 and the timer value present when power is restored.

Referring now to FIG. 21, exemplary tables depicting power provision presence and absence sequences and their associated instructions are presented. A programming module, such as the programming module 1050 of FIG. 19 or the programming module 1100 of FIG. 20 may receive data based on the number of times power is removed (off-cycles). A manual light switch can be used to provide this data.

When the switch is on (conducting), the programming module experiences an on-cycle. When the switch is off (non-conducting), the programming module experiences an off-cycle. When using exemplary table 1152, the number of sequential off-cycles that the programming module experiences determines the function the programming module should perform. To protect against accidental programming, the programming module may not count off-cycles until a programming initiation sequence is applied. An exemplary programming initiation sequence is presented in FIG. 22.

In table 1152, the case of a single off-cycle is reserved to further protect against accidental programming. A sequence of two off-cycles instructs the programming module to command a power line carrier transceiver to transmit its identification code. A sequence of three off-cycles corresponds to an update identification code instruction. This instruction commands a power line carrier receiver/transceiver to replace its current identification code with the next one received over the power line carrier.

The power line carrier receiver/transceiver may stop listening for the replacement identification code after a predetermined period of time. Another instruction that may correspond to a number of off-cycles is a broadcast connection instruction. This instruction causes the power line carrier transceiver to broadcast a message indicating that the power line carrier transceiver. The power line carrier transceiver can then listen for a new address to be sent by a power line carrier control module. A sequence of four off-cycles corresponds to a reset identification code instruction, where the power line carrier receiver is commanded to reset its identification code to a factory default.

Table 1154 presents exemplary instructions appropriate for a timer. The single off-cycle sequence may be reserved. A sequence of two off-cycles may indicate that the timer should be set to 5 minutes, thereby reducing power of the associated light source after 5 minutes. A sequence of three off-cycles may correspond to a length of time of 10 minutes. Sequences of four, five, six, seven, eight, nine, and ten off-cycles may correspond to 20 minutes, 30 minutes, 40 minutes, 50 minutes, 1 hour, 1.5 hours, and 2 hours respectively.

Table 1160 presents exemplary instructions appropriate for power line carrier transceivers and receivers. The sequences in tables 1160 and 1162, which are used to communicate instructions to the programming module, are similar to Morse code. Instead of counting the number of off-cycles, the length of time the switch is cycled either on or off determines the instruction. Cycling the switch for a short period of time corresponds to a first binary state, indicated by a dot in Table 1160. Cycling the switch for a longer period of time corresponds to a second binary state, indicated by a dash in Table 1160.

Sequences of long and short cycling actions are interpreted as instructions by the programming module. The short and long cycling actions may correspond directly to binary digits, and may be used to directly program an address or a length of time. Alternatively, as shown in table 1160, certain sequences may correspond to specific instructions.

A sequence of a short cycling action followed by a long cycling action, followed by a short cycling action, and finally a long cycling action may be reserved for future use. A sequence of long, short, short, long may correspond to a transmit identification code instruction. Similarly, a short, long, long, short sequence may correspond to an update identification code instruction, while long, short, long, short may correspond to a reset identification code instruction.

Table 1162 contains a sequence-to-instruction mapping suitable for a timer. The sequence long, long, long, long may be reserved for future use. The sequence long, long, long, short may correspond to a timer length of 5 minutes. The sequence long, long, short, long may correspond to 10 minutes. Further binary sequences may correspond to timer lengths up to, in this example, 2 hours.

Another exemplary programming technique involves periodic sampling. Once programming has been initiated, the programming module will monitor the state of power at specified intervals. In the middle of each period, the programming module determines whether power is present or absent. These two power conditions correspond to the two binary digits. The interval may be, for example, 5 seconds. In order to allow faster programming, the period may be shorter, such as one second or one half second. Table 1170 contains an exemplary mapping from measured binary digits to programming module functions.

The sequence of 1010 may be reserved for future use. The sequence of 0110 may correspond to a transmit identification code instruction. The sequences 1001 and 0101 may correspond to update identification code and reset identification code instructions, respectively. Table 1172 contains a similar exemplary mapping suitable for a timer. The sequence 0000 may be reserved for future use. The sequence 0001 may correspond to a timer value of 5 minutes. The sequence 0010 may correspond to a timer value of 10 minutes, and so on, up to the sequence of 1001 for 2 hours.

Programming sequences may also provide dimming instructions. For example, programming sequences may correspond to different dimming levels. The dimming level may be set in one programming operation, while duration is set in another. Alternatively, during programming, the light could be gradually increased or decreased in intensity, and when it reaches a desired level, the manual light switch could be turned off. This light intensity can then be restored when the manual light switch is turned back on.

Figure 22:
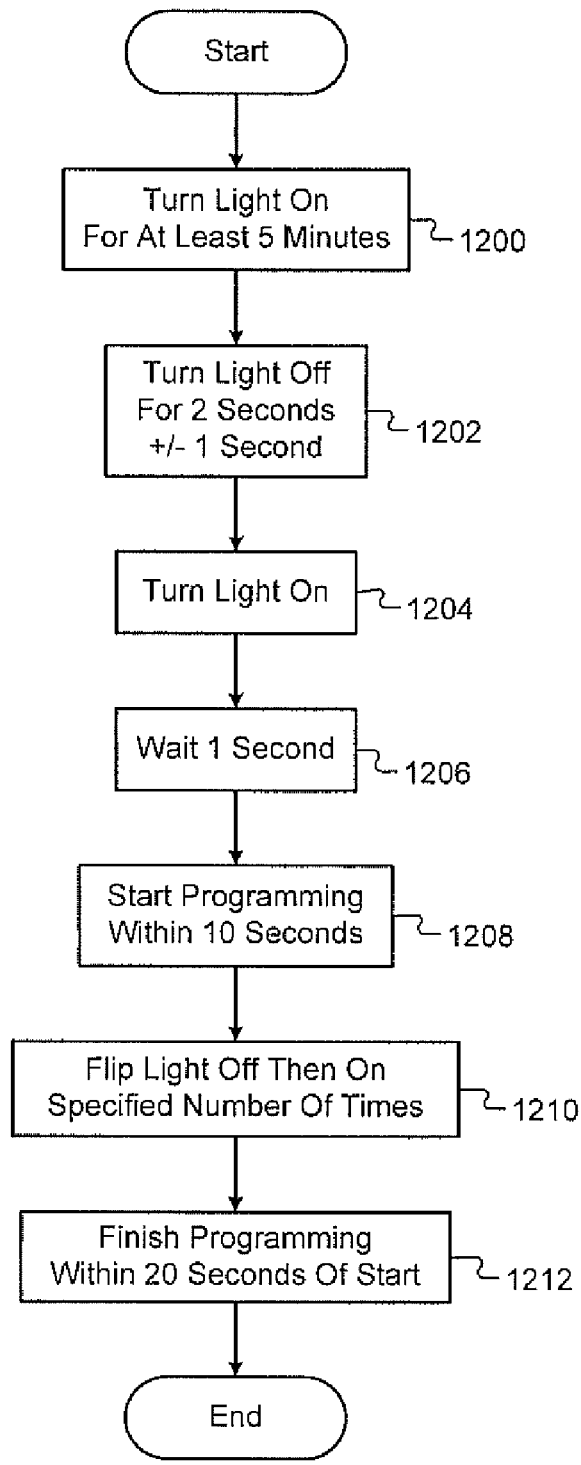
FIG. 22 is a flowchart depicting exemplary steps performed by a user in initiating programming in a programming module.

Referring now to FIG. 22, a flowchart depicts exemplary steps performed by a user in initiating programming in a programming module. Control begins in step 1200, where a controllable light source is switched on for longer than a predetermined period of time, such as 5 minutes. This amount of time allows the charge storage module to store enough charge to provide power during programming operations where the light source will be turned off.

Control continues in step 1202, where the light source is switched off for a predetermined time, such as 2 seconds. To allow for user variability, there may be an error tolerance, such as accepting a time of between 1 and 3 seconds. Control continues in step 1204, where the light source is switched on. After waiting one second in step 1206, control continues in step 1208, where the user can start programming. Switching the light source off for 2 seconds in step 1202 and waiting for 1 second in step 1206 both ensure that programming is not accidentally initiated.

In step 1208, the user begins programming within a predetermined period of time, such as 10 seconds. Otherwise, the programming module will assume that programming was not actually desired. In step 1210, the user flips the light off and then back on a specified number of times. These are the off-cycles referred to in tables 1152 and 1154 of FIG. 21. In step 1212, programming ends within a predetermined period of time after beginning programming, such as within 20 seconds. At this point, the counting off-cycles stops and control ends.

Figure 23:
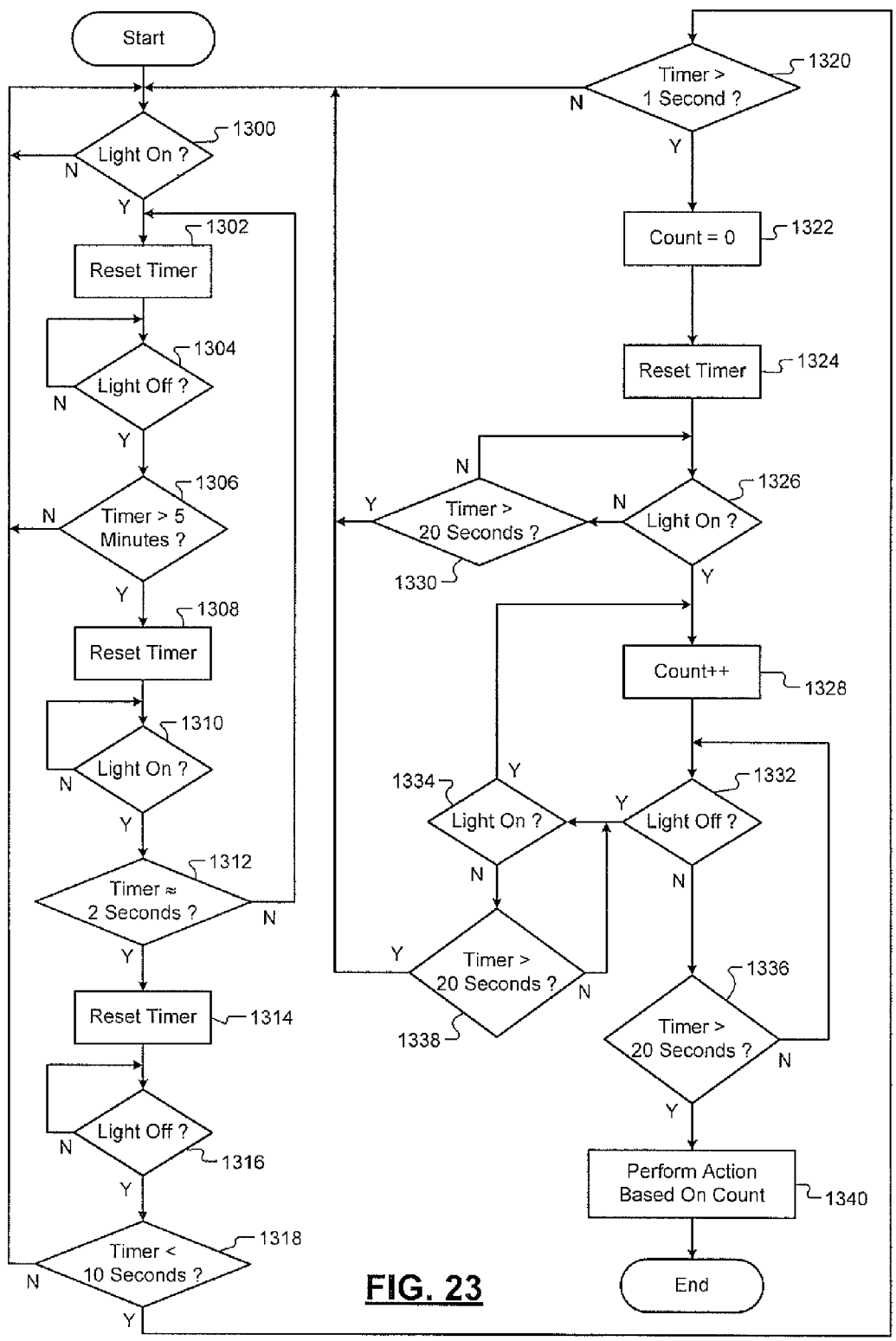
FIG. 23 is a flowchart depicting exemplary operation of the programming module in allowing for user programming input.

Referring now to FIG. 23, a flowchart depicts exemplary operation of the programming module to allow for user programming input as specified in FIG. 22. Control starts in step 1300, where control determines if the light is on. If not, control remains in step 1300; otherwise, control transfers to step 1302. In step 1300, control may find that the light is on when control begins after power is first supplied to the circuit.

In step 1302, the timer is reset to allow it to monitor the amount of time that the light is on. Control continues in step 1304, where control determines if the light is off. Once the light is off, control transfers to step 1306; otherwise, control remains in step 1304. In step 1306, the timer is compared to a value of 5 minutes.

If the value of the timer is greater than 5 minutes, indicating that the light was on for at least 5 minutes, control continues in step 1308; otherwise, control returns to step 1300. This waiting period ensures that the charge store module has adequate charge, and also protects against inadvertent initiation of programming. In step 1308, the timer is reset to monitor the duration the light is off.

In step 1310, control determines whether the light is on. Once the light is on, control transfers to step 1312; otherwise, control remains in step 1310. In step 1312, the timer is compared to a value of 2 seconds. If the timer is approximately equal to 2 seconds, such as within one second of 2 seconds, control transfers to step 1314; otherwise, control returns to step 1302.

In step 1314, the timer is reset. Control continues in step 1316, where control determines whether the light is off. Once the light is off, control transfers to step 1318; otherwise, control remains in step 1316. If the value of the timer is less than 10 seconds, indicating that programming has started within 10 seconds, control transfers to step 1320; otherwise, control returns to step 1300.

In step 1320, if the timer is greater than 1 second, indicating that programming started after waiting for 1 second, control transfers to step 1322. Otherwise, the user did not wait the required 1 second, and control returns to step 1300. The 1 second delay provides further protection against programming being inadvertently initiated. In step 1322, a variable named count is initialized to zero. Control continues in step 1324, where the timer is reset.

In step 1326, if the light is on, control transfers to step 1328; otherwise, control transfers to step 1330. In step 1330, if the timer is greater than 20 seconds, the amount of time for programming has been exceeded. A single off-cycle has not been completed and control returns to step 1300. Otherwise, time remains for programming and control returns to step 1326. In step 1328, count is incremented and control continues in step 1332.

In step 1332, control determines if the light is off. If the light is off, control transfers to step 1334; otherwise, control transfers to step 1336. In step 1334, if the light is on, control transfers to step 1328; otherwise, control transfers to step 1338. In step 1338, if the timer has exceeded 20 seconds, control returns to step 1300; otherwise, control returns to step 1334.

In step 1336, if the timer has exceeded 20 seconds, control transfers to step 1340; otherwise, control returns to step 1332 to wait for the light to be turned off. In step 1340, the programming module performs an action based upon the value of count. The variable count now contains the number of off-cycles, and the corresponding function may be determined, such as by using table 1152 for power line carrier transceivers/receivers or table 1154 for timers. Control then ends. Alternatively, control may return to step 1302 to wait for programming mode to once again be initiated.

Figure 24:
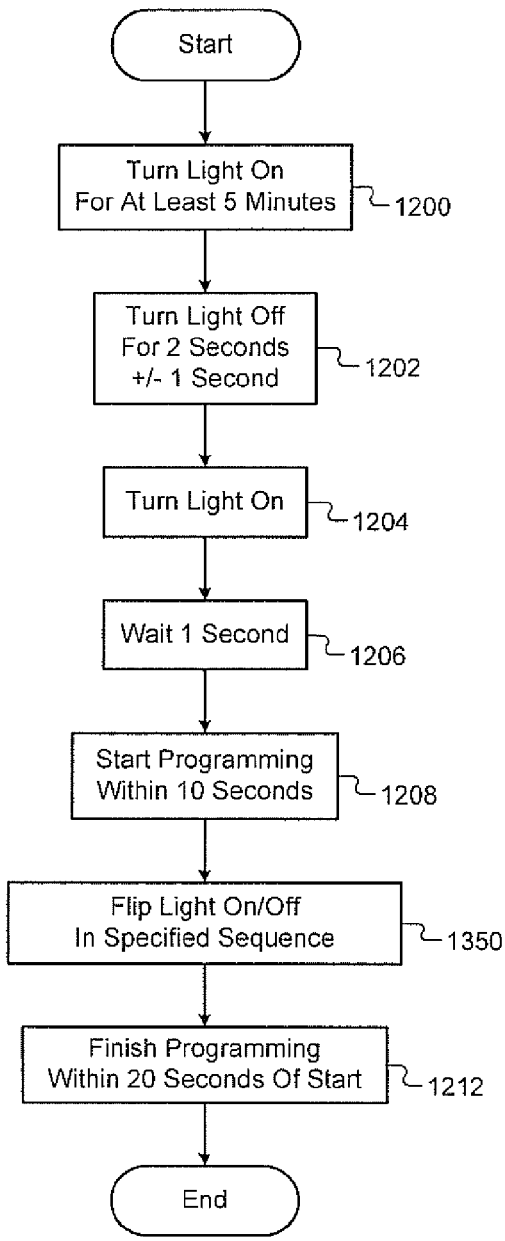
FIGS. 24-26 are flowcharts depicting exemplary programming operations performed by a user.

Referring now to FIG. 24, a flowchart depicts exemplary programming steps corresponding to tables 1160 and 1162 of FIG. 21. For purposes of clarity, reference numerals from FIG. 22 are used to identify similar components. The programming module is activated in steps 1200 to 1208, similarly to FIG. 22. Control continues in step 1350, where the light is flipped on and off in the specified sequence.

The sequence is then interpreted, such as by looking at a table, such as table 1160 or table 1162 of FIG. 21. As discussed in greater detail with respect to FIG. 21, the dots and dashes correspond to lengths of time that the light is flipped on or off. Depending upon the implementation, the on time or the off time may be of interest. For instance, if the on time is of interest, the light should be switched on for a short period of time corresponding to a dot and switched on for a longer period of time corresponding to the dash, while the time that the light is switched off is immaterial.

Alternatively, the light could remain on, and be switched off for a short time corresponding to the dot and switched off for a longer period of time corresponding to the dash. Control then continues in step 1212, where programming is finished within 20 seconds of beginning. In various implementations, the time allowed for programming may be less or greater. For instance, if an address is directly programmed into the programming module, a longer period of time may be allowed. Control then ends.

Figure 25:
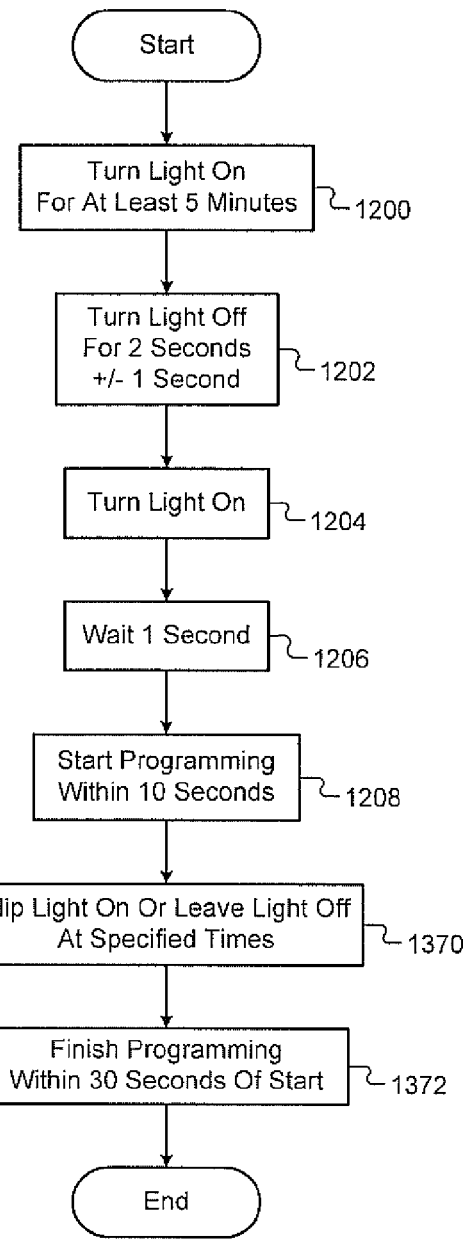

Referring now to FIG. 25, a flowchart depicts exemplary programming steps corresponding to tables 1170 and 1172 of FIG. 21. For purposes of clarity, reference numerals from FIG. 22 are used to identify similar components. The programming module is activated in steps 1200 to 1208, similarly to FIG. 22. Control continues in step 1370, where the light is turned on or turned off at specified time intervals. The programming module samples whether power is present during each time interval.

For instance, if the time period is 5 seconds long, a sequence of 1001 would include of turning the light on for 5 seconds, turning the light off for 10 seconds, and turning the light on for 5 seconds. The programming module may sample in the middle of each 5 second period to allow for user variability. Control continues in step 1372, where programming is finished within a predetermined period of time, such as 30 seconds. Control then ends.

Figure 26:
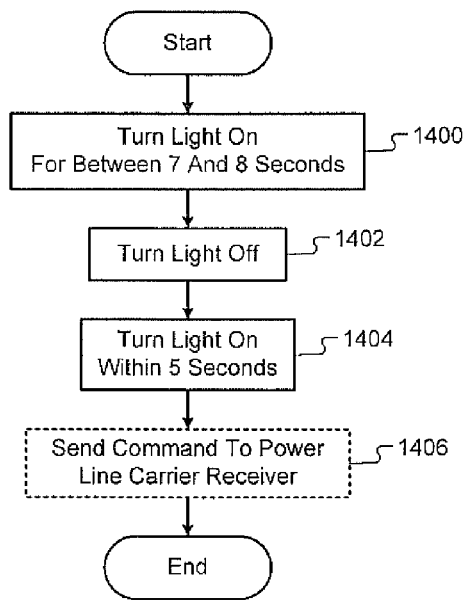

Referring now to FIG. 26, a flowchart depicts another exemplary programming approach for a user. Control begins in step 1400, where a light is turned on for between 7 and 8 seconds. The light is then turned off in step 1402. In step 1404, the light is turned back on within 5 seconds. This sequence may generate a program signal, which is communicated to a power line carrier receiver or transceiver.

Upon receiving the program signal, the power line carrier transceiver may transmit a message containing its identification code, which can be received by a power line carrier control module to obtain the address of the controller. Alternatively, the program signal may cause the power line carrier receiver or transceiver to reset its identification code to a factory set default.

Alternatively, the program signal may cause the power line carrier transceiver or receiver to listen for an instruction, such as an address setting instruction. In this case, the user broadcasts a command over the power line carrier once the power line carrier receiver/transceiver is placed in the listen mode. If an address is then sent to the power line carrier receiver, the power line carrier receiver can thereafter respond to commands identified by that address. Control then ends.

Figure 27:
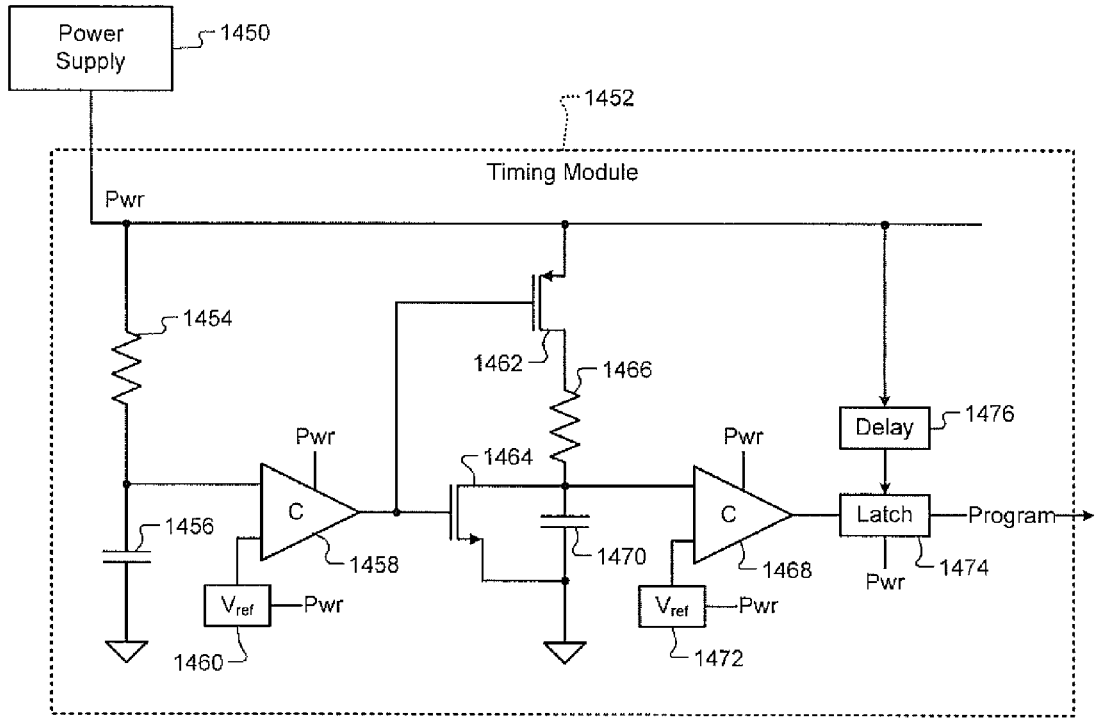
FIG. 27 is a functional schematic diagram of an exemplary programming module that implements the programming operation of FIG. 26.

Referring now to FIG. 27, a functional schematic diagram of an exemplary programming module implementing the programming operation of FIG. 26 is presented. A power supply 1450 provides power to a timing module 1452. The timing module 1452 outputs a program signal, which is received by a power line carrier transceiver or receiver.

The timing module 1452 includes a first resistance 1454 having a first end that communicates with the power supply 1450 and a second end that communicates with a first end of a first capacitor 1456. A second end of the first capacitor 1456 communicates with a reference potential, such as a ground potential. The first end of the first capacitor 1456 communicates with a first input of a first comparator 1458.

A second input of the first comparator 1458 communicates with a first reference voltage generator 1460, which is powered by the power supply 1450. The timing module 1452 includes first and second transistors 1462 and 1464. In various implementations, the first and second transistors 1462 and 1464 are metal-oxide-semiconductor field-effect transistors (MOSFETs) that have gates, sources, and drains, although other transistor types may be used.

The source of the first transistor 1462 communicates with the power supply 1450. The gate of the first transistor 1462 communicates with an output of the first comparator 1458 and with the gate of the second transistor 1464. A second resistance 1466 includes first and second ends that communicate with the drain terminals of the first and second transistors 1462 and 1464, respectively.

The drain of the second transistor 1464 communicates with a first input of a second comparator 1468 and with a first terminal of a second capacitor 1470. A second terminal of the second capacitor 1470 and the source of the second transistor 1464 communicate with the reference potential. A second input of the second comparator 1468 communicates with a second reference voltage generator 1472, which is powered by the power supply 1450.

An output of the second comparator 1468 is communicated to a latch 1474. The latch 1474 is actuated by a delay module 1476, which receives power from the power supply 1450. The first and second comparators 1458 and 1468 and the latch 1474 receive power from the power supply 1450. An output of the latch 1474 serves as the program signal.

When power is first applied to the timing module 1452, the first input and, therefore, the output of the first comparator 1458 are at the reference potential because there is no charge across the first capacitor 1456. The low output of the first comparator 1458 turns off the second transistor 1464 and turns on the first transistor 1462. Because the first transistor 1462 is on, the second capacitor 1470 charges through the second resistance 1466.

The values of the first and second capacitors 1456 and 1470 and the first and second resistances 1454 and 1466 are chosen so that the second capacitor 1470 will become fully charged before the first capacitor 1456. Once the second capacitor 1470 has fully charged and power to the power supply 1450 is removed, the charge across the second capacitor 1470 will slowly discharge.

If power is restored to the power supply 1450 quickly thereafter, there will be enough charge across the second capacitor 1470 to cause a high output on the second comparator 1468. This high output will then be latched by the latch 1474. The latch 1474 is actuated by the delay module 1476, which actuates the latch 1474 once the second comparator 1468 has had time to settle upon power being supplied by the power supply 1450.

The output of the latch 1474 will remain high until power is removed from the circuit. If, after the second capacitor 1470 had become fully charged, the power to the power supply 1450 had remained on, the first capacitor 1456 eventually would become fully charged. Based on the first reference voltage generator 1460, the output of the first comparator 1458 would go high as the first capacitor 1456 fully charged. This would turn off the first transistor 1462 and turn on the second transistor 1464. The second transistor 1464 would quickly discharge the charge across the second capacitor 1470.

The values of the second resistance 1466 and the second capacitor 1470 may be chosen so that the second capacitor

1470 charges in approximately 6 seconds, while the values of the first resistance 1454 and the first capacitor 1456 are chosen so that the first capacitor 1456 charges in approximately 8 seconds. The user can then turn on the power and after between 6 and 8 seconds, turn the power off.

Charge will remain on the second capacitor 1470, possibly leading to a high programming signal when power is restored. The second reference voltage generator 1472 determines how much charge remaining on the second capacitor 1470 will produce a high output from the second comparator 1468. For example, the second reference voltage generator 1472 may be designed so that power can be removed for up to 5 seconds. The timing module 1452 can be modified to allow for more complex programming procedures. For example, further comparators and capacitors may be added to track more on/off actuations before the programming signal is produced.

Figure 28:
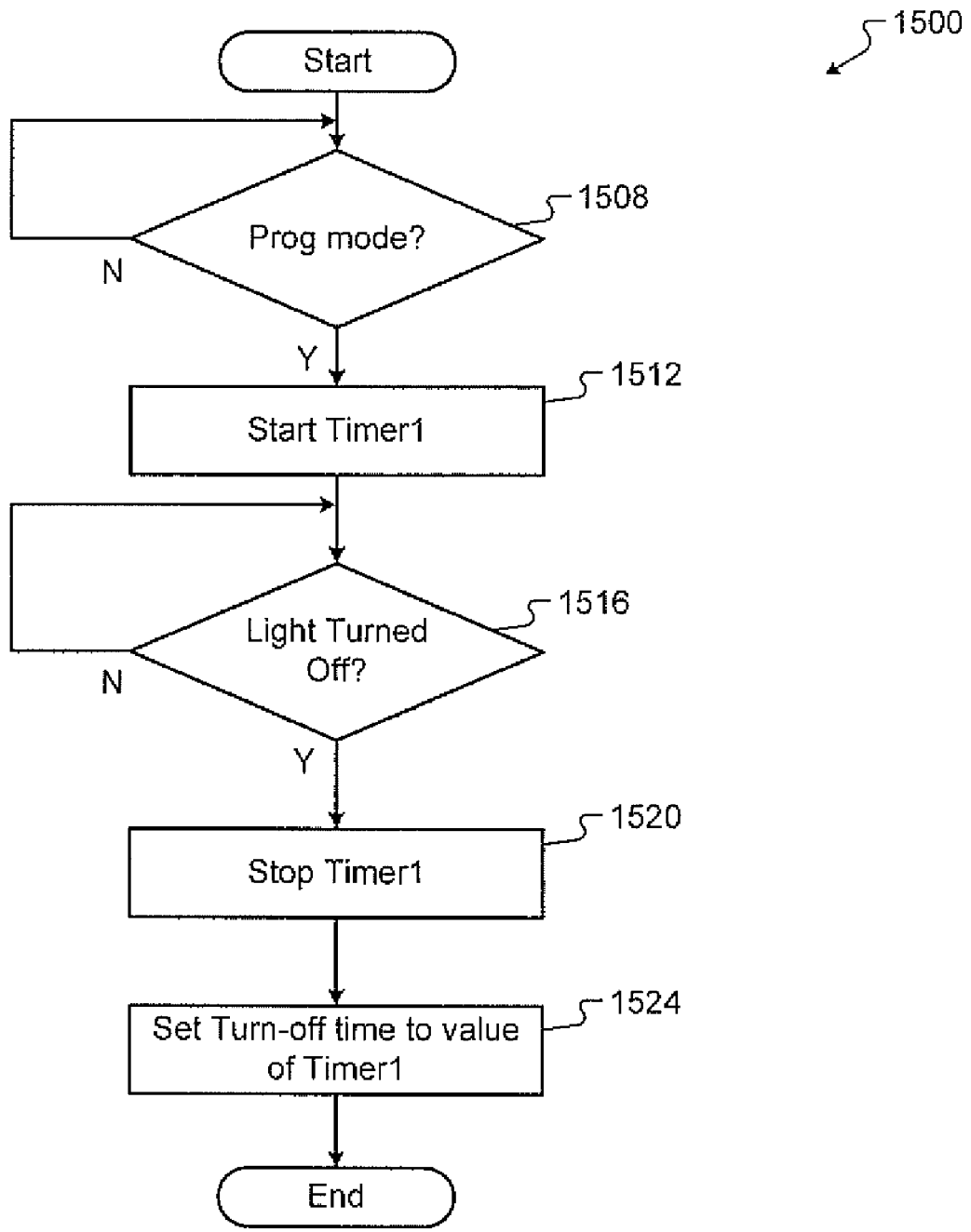
FIGS. 28-29 are flowcharts depicting exemplary operation of programming modules in allowing for user programming input.

Referring now to FIG. 28, an exemplary method 1500 for operating the controllable fixture, adapter, and/or bulb is shown. In this approach, the controllable fixture, adapter, or bulb is placed in the programming mode using any suitable approach. Then, the user leaves the light on for a period that is equal to the desired duration for automatic turn-off, the user turns off the light. The controllable fixture, adapter, or bulb measures and stores this duration. The controllable fixture, adapter, or bulb then automatically turns off the light after the light has been on for the stored duration.

Control begins in step 1508, where control determines whether a programming mode has been entered. If step 1508 is true, control starts a timer (Timer1) in step 1512. In step 1516, control determines whether light has been turned off using the switch. If step 1516 is true, control stops the timer (Timer1) in step 1520. In step 1524, control sets the automatic turn-off time equal to a value of the timer (Timer1). Control then ends.

Figure 29:
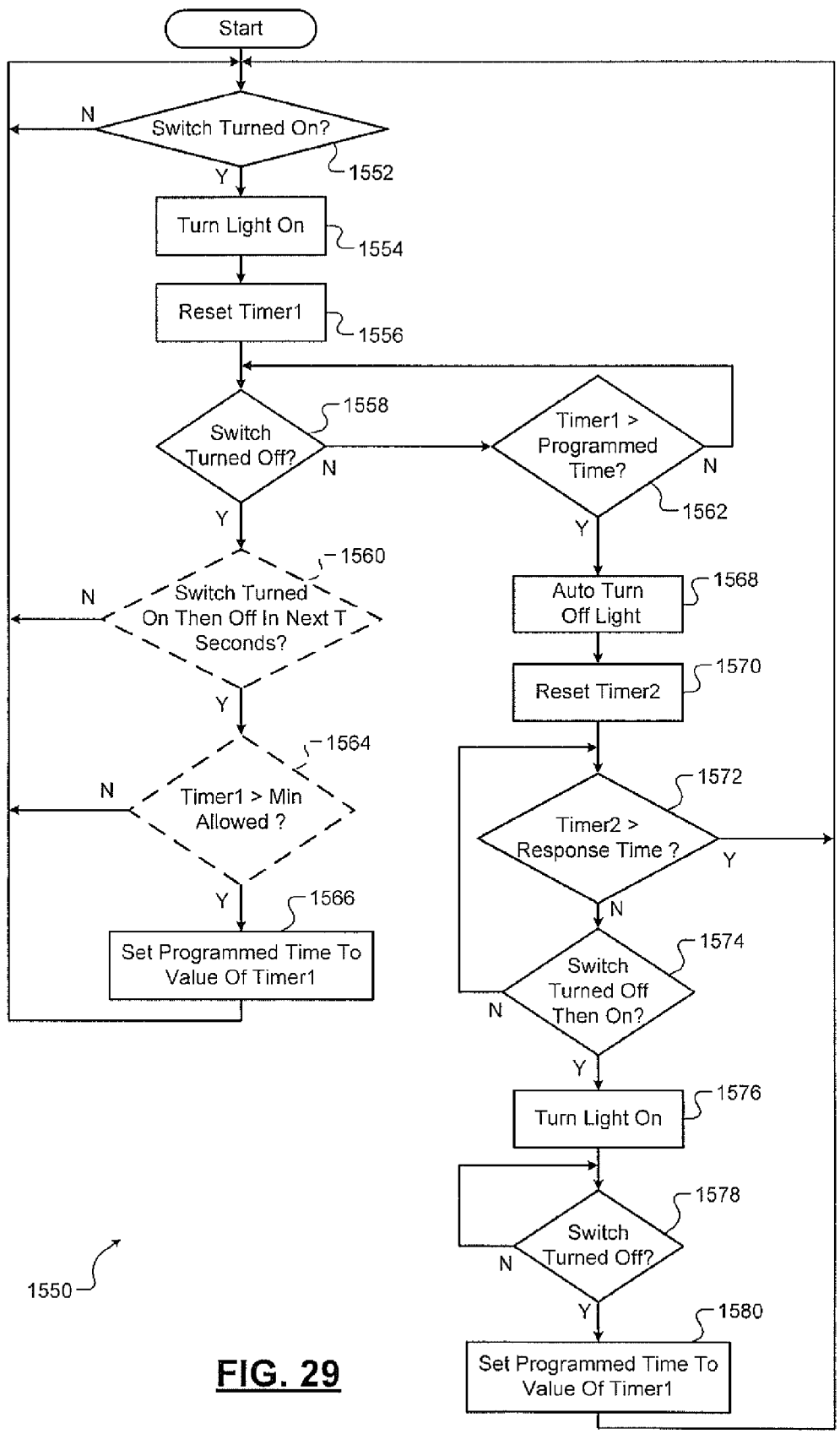

Referring now to FIG. 29, another exemplary method 1550 for operating the controllable fixture, adapter, and/or bulb is shown. The method 1550 sets the amount of time before a light is automatically turned off via user interaction. The programmed time that the light will stay on may be initially set at the time of manufacturing or installation of the controllable fixture, adapter, and/or bulb. The initial setting of the programmed time may also have been set according to one or more of the approaches identified above or any other suitable approach.

Once a light switch has been turned on, the controllable fixture, adapter, or bulb will cause a light producing element to generate light until the programmed time has expired. To reduce the programmed time, the light can be manually switched off before the programmed time has expired. The amount of time that the light was on will become the new programmed time.

To avoid inadvertently reducing the programmed time, the programmed time may only be updated if the light switch is turned off, then on, then off in rapid succession. If the light switch is simply turned off, the programmed time will be unaffected. In various embodiments, a minimum programmed time may be defined. If the light is manually turned off in less than the minimum programmed time, the programmed time will be unchanged. This allows a user to turn the light on for a short period of time without affecting the value of the programmed time.

In order to increase the programmed time, once the programmed time has expired and the light has turned off, the user can cycle the light switch off then on. The light will then stay on until the user manually turns it off. The programmed time will then be increased by the amount of time the light was on after this manual intervention.

In various embodiments, the new programmed time includes the time between when the light was programmatically turned off and the time when the user manually cycled the light switch. If the light has been off for a long period of time when the user cycles the light switch off and on, the user may not want to extend the programmed time, but instead start a new lighting cycle. For this reason, if the off-on cycling occurs after a predetermined period of time, the programmed time is not changed, and the light is simply turned on again. Once the programmed time has elapsed, the light will once again be turned off.

To prevent inadvertent lengthening of the programmed time, the light switch sequence used to lengthen the programmed time may be made more complex than off-on. For example, the programmed time may be lengthened when the light switch is turned off-on-off-on within a predetermined amount of time after the light is programmatically turned off. For example only, the predetermined amount of time may be 10 seconds.

Method 1550 begins in step 1552, where control determines whether the light has been turned on. If the light has been turned on, control transfers to step 1554; otherwise, control remains in step 1552. In step 1554, control turns the light on and continues in step 1556, where control resets a first timer (timer1). Once timer1 reaches a programmed time value, the light will automatically be turned off. Control continues in step 1558, where control determines whether the light has been turned off via a manual light switch. If so, control transfers to step 1560; otherwise, control transfers to step 1562.

Alternatively, instead of transferring to step 1560, control may transfer to step 1564. Step 1560 implements a more complex programming procedure that reduces the likelihood of inadvertent programming. Instead of updating the programmed time when the light switch is turned off, the programmed time is updated only when the switch is turned off, then on, then off within a predetermined period of T seconds. In step 1560, control determines whether the switch being turned off is followed within T seconds by the switch being turned on then off again. If so, control continues in step 1564; otherwise, control returns to step 1552.

In step 1564, control determines whether Timer1 is greater than a minimum allowed programmed time. If so, control transfers to step 1566; otherwise, control returns to step 1552. Step 1564 provides another safeguard against inadvertent programming. The programmed time will not be updated if the light has been on for less than the minimum allowed programmed time. This allows the light to be turned on and off quickly without affecting the programmed time.

For example, a controllable bulb, fixture, or adapter may have a minimum allowed programmed time of 10 minutes and be installed in a workroom. The programmed time may be programmed to two hours, which is appropriate for typical work conducted in the workroom. If the user turns on the light in the workroom for less than ten minutes (such as to retrieve a tool), the programmed time will remain at the previously set two hours.

If this safeguard is not desired, step 1564 may be skipped, with control proceeding directly to step 1566. In various implementations, the minimum allowed programmed time may be set to zero, effectively skipping step 1564. In step 1566, the value of timer1 is stored as the new programmed time. Control then returns to step 1552.

In step 1562, control determines whether timer1 is greater than the programmed time. If so, control transfers to step 1568; otherwise, control returns to step 1558. In step 1568, the light is automatically turned off and control continues in step 1570. In step 1570, a second timer (timer2) is reset and control continues in step 1572.

If the user turns the light back on within a predetermined response time after the light is automatically turned off in step 1568, control may update the programmed time based on the light being turned back on. For example, the predetermined response time may be set to one minute. With this setting, once the light has been turned off, the user has one minute in which to turn the light back on and have this additional on-time stored incorporated into the programmed time.

In step 1572, control determines whether timer2 is greater than the predetermined response time. If so, the user may turn the light back on, but the programmed time will not be updated; control returns to step 1552. Otherwise, control transfers to step 1574. In step 1574, control determines whether the light switch has been turned off and on. If so, control transfers to step 1576; otherwise, control returns to step 1572. In step 1576, control turns the light on and continues in step 1578.

The method 1550 may be modified to accommodate a more complex programming procedure that safeguards against inadvertent lengthening of the programmed time. For example, another comparison may be inserted between steps 1574 and 1576, where control determines whether the light switch has been turned off and on again. If so, control will continue to step 1578; otherwise control will wait until the switch is turned off, at which point control will return to step 1552.

In step 1578, control determines whether the switch has been turned off. If so, control transfers to step 1580; otherwise, control remains in step 1578. In step 1580, control stores the value of timer1 as the new programmed time. Control then returns to step 1552.

In various implementations above, the bulbs and/or controllable bulbs may be connected to the adapters, fixtures, controllable adapters, and/or controllable fixtures using threaded connections, one or more pins that are received in one or more sockets, and/or other electromechanical connections. After the controllable bulb, adapter, or fixture turns off the light, the light can be turned on again by turning off the switch and turning it back on.

Turning now to FIGS. 30-37, additional approaches for controlling lights and other devices are shown. In some of the preceding implementations described above with respect to FIGS. 2-29, the user toggled a conventional switch in a predetermined pattern to program the controllable bulb, adapter, or fixture. As can be appreciated, the amount of programming data that can be exchanged using this approach is somewhat limited.

In FIGS. 30-37, a conventional switch may be replaced by a master controller that includes a user interface. The master controller may program one or more remotely-located controllable devices. Supply power to the controllable devices may be delivered to the master controller via a supply line. The master controller sends control data and/or program data via the supply line to the controllable devices.

For example only, the user interface may include a keypad, one or more buttons, and/or other input devices. When a user actuates the user interface, the master controller sends control data and/or program data via the supply line using a missing pulse format. As a result, one or more of the controllable devices may be programmed based on one or more sets of control data and/or programs associated with the interface actuation.

The missing pulse format encodes data by removing portions of selected periods of a power signal and will be described further below. This allows for faster and more precise transfer of information than by manually toggling a switch. As a result, more complex programming operations may be performed without relying on the manual dexterity of the user. For example, a device may be programmed to turn on to full intensity, decrease to half intensity after two hours, and turn off after four hours.

Furthermore, the master controller may communicate with multiple controllable devices and may coordinate control of the multiple controllable devices based on the user input. In addition, some of the controllable devices associated with the master controller may be programmed differently than others of the controllable devices when a user interface element, such as a single button, is actuated by the user.

According to the present disclosure, a single input can be used to control multiple controllable devices. For example only, this allows for scene lighting control including multiple controllable lights and/or control of additional devices such as motorized window shades. A single button may also be used to program multiple controllable devices to turn on their respective lights to various intensities for different periods of time. The single button may also select predetermined programs within the controllable devices that effect this behavior.

As described below, a computer may be interfaced to the master controller and/or the controllable devices to store or change programming information and/or to direct the operation of the master controller. The computer can access an interface via a web page. Using the interface, the user can create custom programs and download them to the master controller.

Figure 30:
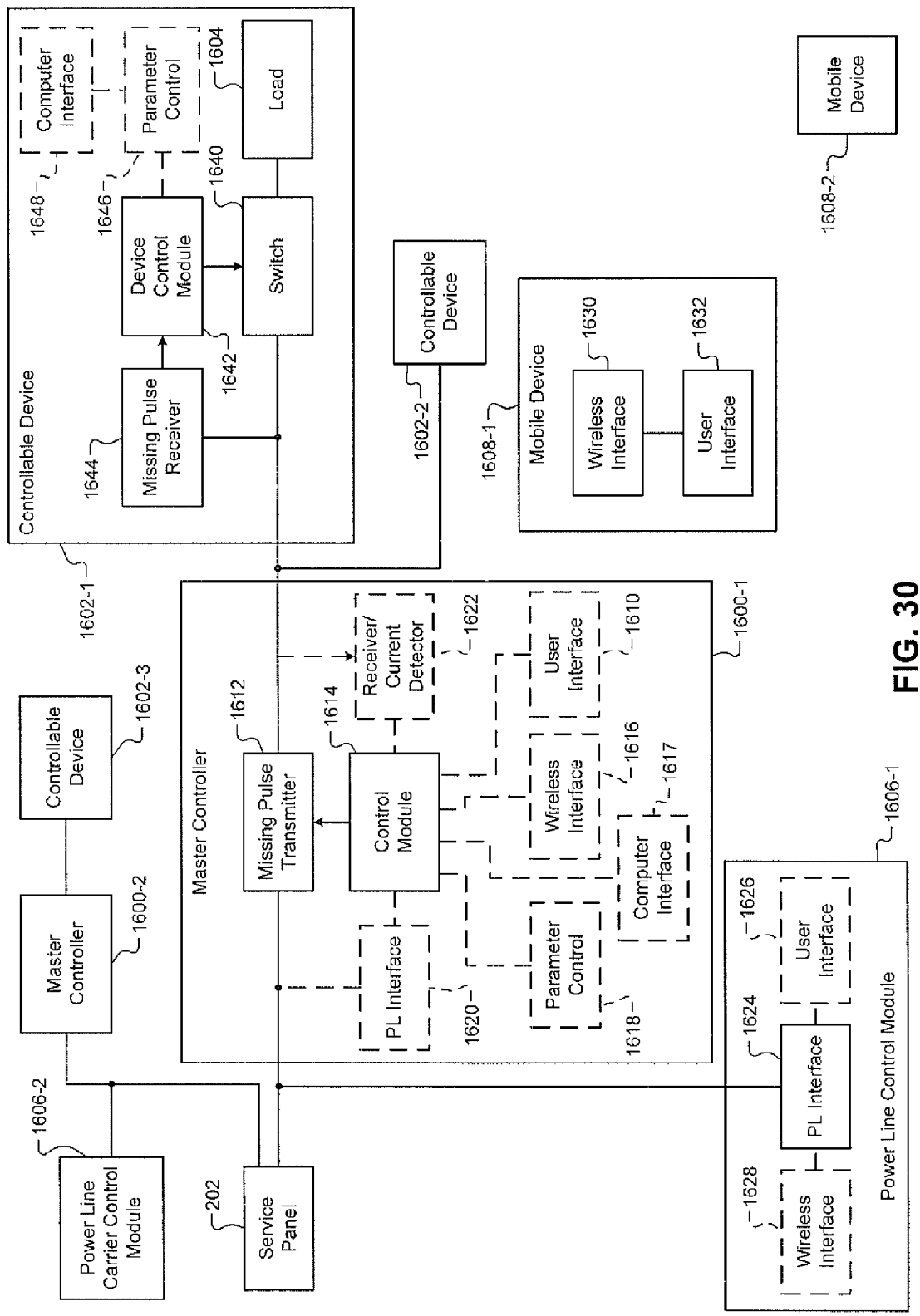
FIGS. 30-30B are functional block diagrams of exemplary programmable load control systems according to the principles of the present disclosure.
Figure 30B:
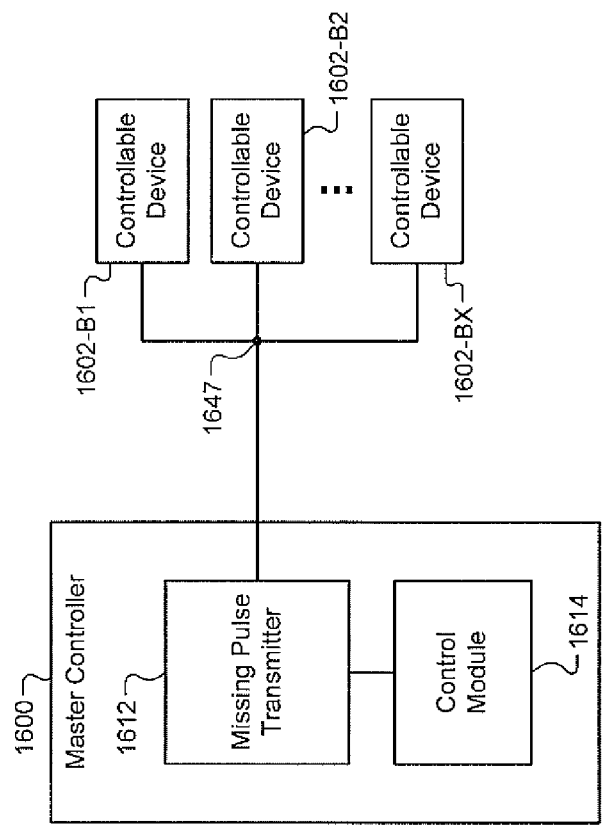
Figure 30A:
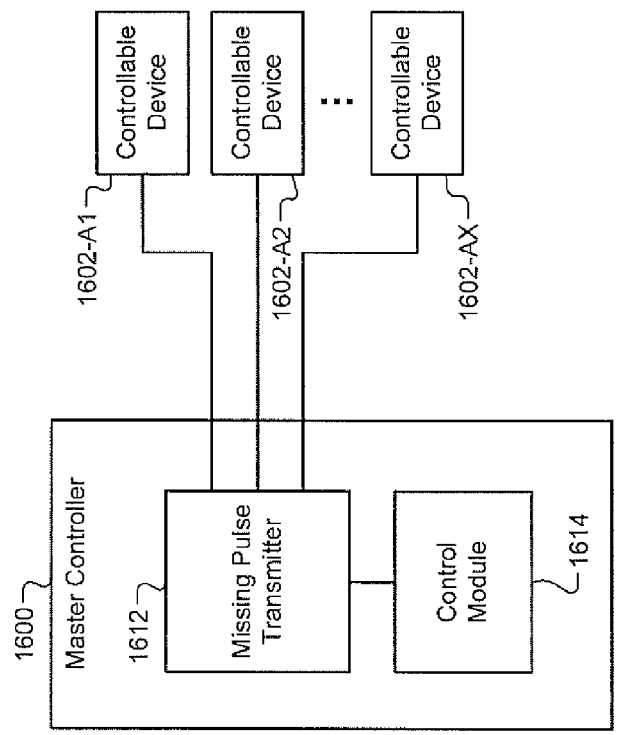
Figure 37:
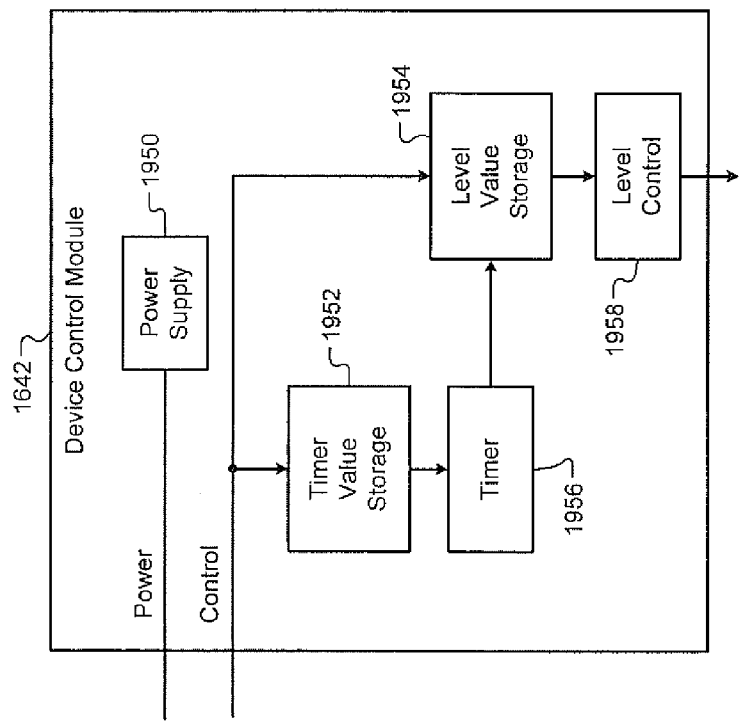
FIG. 37 is a functional block diagram of an exemplary device control module according to the principles of the present disclosure.
Figure 38:
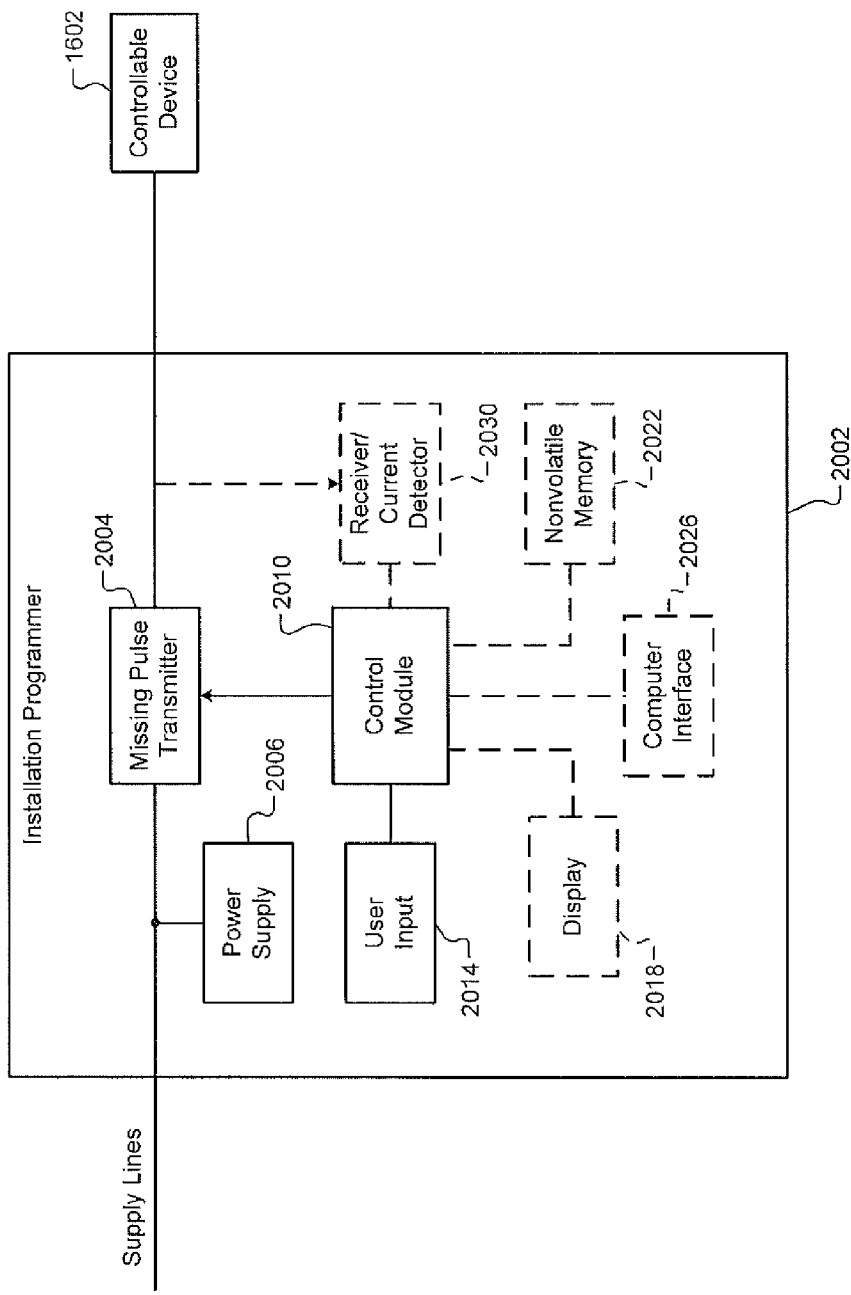
FIG. 38 is a functional block diagram of an exemplary installation programmer according to the principles of the present disclosure.

Briefly, an exemplary system is introduced in FIGS. 30, 30A, and 30B. In FIGS. 31A-31D, exemplary missing pulse encoding that may be used to communicate data to the controllable device is described more fully. In FIGS. 32-35B, exemplary components of a master controller are depicted. In FIGS. 36A-37, exemplary components of a controllable device are depicted. In FIG. 38, an exemplary installation programmer that can be used to store initial programming data into controllable devices is depicted.

Returning to FIG. 30, a functional block diagram of an exemplary programmable load control system is presented. A master controller 1600-1, such as a wall mounted button assembly, receives power from the service panel 202. The master controller 1600-1 generates and transmits programming data to one or more controllable devices, such as controllable devices 1602-1 and 1602-2. The master controller 1600-1 may encode the programming data using missing pulses, as will be described below.

Based on the programming data, the controllable device 1602-1 controls a load 1604. The load 1604 may be integrated with the controllable device 1602-1, as shown in FIG. 30, or may be separate. For example only, the controllable device 1602-1 may include a light fixture, a light bulb socket adapter, or a light bulb, while the load 1604 may include a light bulb or a light producing element.

By using missing pulses, the master controller 1600-1 can transmit data faster than a human being can when toggling a switch. This allows for more complex control operations than otherwise may be available. For example only, the missing pulse approach allows transmission of more specific control data, such as instructions to turn the load 1604 on at full intensity, decrease the intensity after x minutes, further decrease the intensity after y minutes, and finally turn off the load 1604 after z minutes.

The master controller 1600-1 includes a missing pulse transmitter 1612, which receives power from the service panel 202. The missing pulse transmitter 1612 provides power to other components of the master controller 1600-1. The missing pulse transmitter 1612 transmits a power signal to the controllable device 1602-1 and encodes control data for the controllable device 1602-1 by removing pulses from the power signal.

The missing pulse transmitter 1612 is controlled by a control module 1614. The control module 1614 may communicate with optional components, such as a user interface 1610, a wireless interface 1616, a computer interface 1617, a parameter control module 1618, and/or a power line interface 1620. The user interface 1610 allows a user to interact with the master controller 1600-1, such as by pushing buttons, and is described in further detail below.

Alternately or additionally, the master controller 1600-1 may receive user input via the wireless interface 1616 and/or the power line interface 1620. The wireless interface 1616 may communicate with other master controllers, such as the master controller 1600-2, with network access points, and/or with personal computers. The wireless interface 1616 may also communicate with mobile devices, such as mobile devices 1608-1 and 1608-2. The wireless interface may use a wireless local area network (WLAN) standard such as IEEE 802.11, 802.11a, 802.11b, 802.11g, 802.11h, 802.11n, 802.16, or 802.20, and may support wireless personal area network (WPAN) standards such as IEEE 802.15.1.

The power line interface 1620 may communicate with other master controllers, such as the master controller 1600-2, and with power line carrier control modules, such as power line carrier control modules 1606-1 and 1606-2. The power line interface 1620 communicates via supply lines that are in communication with the service panel 202. The power line carrier control module 1606-2, the master controller 1600-2, and another controllable device 1602-3 may be located on another branch circuit of the service panel 202.

The parameter control module 1618 stores data such as load characteristics, user preferences, and presets for use by the control module 1614. This data may include addresses of controllable devices when multiple controllable devices will be controlled by the same master controller. This data may also specify which controllable devices are part of a scene, and to what intensity they should be set for the scene.

The parameter control module 1618 may be configured upon installation of the master controller 1600-1, may be updated during use of the master controller 1600-1, and/or may be hard-coded during manufacturing. The parameter control module 1618 is described in more detail with respect to FIG. 33. The parameter control module 1618 may also be programmed by the computer interface 1617.

The computer interface 1617 may include a serial interface, such as RS-232 or universal serial bus (USB), and/or a network interface, such as IEEE 802.3. By using the computer interface 1617, a user or installer may update the contents of the parameter control module 1618. For example, the user may access a website to create a custom program.

Additionally, the computer interface 1617 may also be used to directly control the control module 1614. In this way, a user can control controllable devices and/or select scenes from their computer. If the computer is connected to the Internet, commands may be sent to the computer remotely (such as from the user's work) to control the control module 1614.

The master controller 1600-1 may include a receiver/current detector 1622, which communicates with the control module 1614. The receiver/current detector 1622 may sense current consumed by downstream devices, such as the controllable devices 1602-1 and 1602-2. By interrupting the consumption of current during periods when there are no missing pulses being sent, the controllable device 1602-1 can communicate data back to the master controller 1600-1. The receiver/current detector 1622 decodes these missing current pulses as data for the master controller 1600-1.

The power line carrier control module 1606-1 includes a power line interface 1624, which communicates with other devices via signals superimposed on power signals originating from the service panel 202. The power line carrier control module 1606-1 may include a user interface 1626 and/or a wireless interface 1628, which communicate with the power line interface 1624.

The power line interface 1624 communicates user input data to the master controller 1600-1 and/or to the master controller 1600-2. The user input data may be received from the user interface 1626 and/or the wireless interface 1628. The wireless interface 1628 receives user input data from other input devices, such as the mobile devices 1608-1 and 1608-2.

The mobile device 1608-1 may comprise a smartphone, a laptop, a personal digital assistant, a remote control, etc. The mobile device 1608-1 includes a wireless interface 1630 and a user interface 1632. The wireless interface 1630 wirelessly transmits data received from the user via the user interface 1632. The wireless interface 1630 may also function as a repeater for wireless signals from devices that may be out of range of the master controller 1600-1, such as the mobile device 1608-2.

The controllable device 1602-1 includes a switch 1640, a device control module 1642, and a missing pulse receiver 1644. The switch 1640 receives a power signal from the missing pulse transmitter 1612 of the master controller 1600-1. The switch 1640 is controlled by the device control module 1642. The device control module 1642 is configured by the missing pulse receiver 1644.

The device control module 1642 may also communicate with a parameter control module 1646, which provides parameters that may be configured during installation. In various implementations, the parameter control module 1646 may also be updated by the missing pulse receiver 1644 during normal operation. The parameter control module 1646 may include data such as that stored in the parameter control module 1618 of the master controller 1600-1. In addition, the parameter control module 1646 may be programmed and/or updated via a computer interface 1648 similar to the computer interface 1617.

Referring now to FIGS. 30A and 30B, various ways of connecting the master controller to the controllable devices is shown. In FIGS. 30A and 30B, a simplified view of one of the master controllers 1600 is shown. In FIG. 30A, the missing pulse transmitter 1612 communicates directly with each of the controllable devices 1602-A1, 1602-A2, ..., and 1602-AX.

In FIG. 30B, the missing pulse transmitter 1612 communicates with one or more nodes 1647. Each of the controllable devices 1602-B1, 1602-B2, ..., and 1602-BX communicates either directly with the node 1647 or indirectly with the node 1647 (via other nodes—not shown). As can be appreciated, a hybrid master controller relating to FIGS. 30A and 30B can be used with both direct connections and connections through one or more nodes. The missing pulse transmitter 1612 generates addressing data in addition to other control data sent to the controllable devices 1602.

The addressing data selects the controllable device associated with the control data being sent. Advantages of the configuration in FIG. 30B include simplified connections to the master controller 1600. The master controller 1600 may be arranged in a junction box. It may be difficult to separately connect all of the power conductors for each of the controllable devices 1602 to the master controller 1600 in the same junction box. Furthermore, the addressing approach allows multiple controllable devices to be connected and individually controlled.

Referring now to FIG. 31A, a graphical depiction of missing pulse transmission is presented. Power is typically carried by a sinusoidal voltage waveform 1700 characterized by a frequency. For example, the frequency may be approximately 50 Hz or 60 Hz. Each period of the voltage waveform 1700 is composed of a positive half-sine wave and a negative half-sine wave. If portions of these half-sine waves, also called pulses, are truncated, downstream devices can interpret these missing pulses as data.

For example a missing pulse is depicted at 1702. Instead of following a dashed sinusoid 1703, the voltage waveform 1700 remains flat during the missing pulse 1702. The missing pulse 1702 is shown only for exemplary purposes as a missing half-period starting and ending at zero-crossings. Missing pulses may occur for any portion of a period of the voltage waveform 1700 and do not necessarily start or stop at a zero-crossing. However, sending missing pulses between the zero-crossing may reduce stress on the switches used to encode the missing pulses.

The missing pulse 1702 is followed by two full pulses and then a second missing pulse 1704. The second missing pulse 1704 is followed by two full pulses and then a third missing pulse 1706. This sequence of full and missing pulses can be interpreted as data. The voltage waveform 1700 may be centered about zero volts. Therefore, during times of missing pulses, the voltage may be held at zero volts. A filter may be applied to round off corners (such as those indicated at 1710-1 and 1710-2) of the missing pulses to minimize high frequency noise on the voltage waveform 1700.

Removing pulses decreases power available to downstream devices. For example only, if 120 pulses per second are present in the voltage waveform 1700 and six pulses are removed every second, only 6/120 or 5% of average power is lost. A data rate of only a few symbols per second is still greater than a human being could reliably achieve by toggling a wall switch and only slightly reduces available power.

This data rate can be efficiently used by prioritizing data and transmitting higher priority data to the controllable device 1602-1 before transmitting lower priority data. For example, high priority data may include the intensity at which to turn on the load. Information such as the timing of future dimming or turn-off events may have a lower priority. For example, if instructing the controllable device 1602-1 to turn full on for 30 minutes and then reduce intensity by 25% at a later time such as 30 minutes later, only the full on command will be transmitted immediately. There is a period of 30 minutes in which to transmit the dimming percentage and timing information.

The data that is transferred may optionally include data integrity metrics, such as parity bits and/or CRC (cyclic redundancy check) values. FIGS. 31B-31D depict further exemplary implementations of missing pulses. FIG. 31B depicts a missing pulse 1712 where the top of a positive half-sine wave is limited to a certain voltage that is greater than zero. Similarly, negative half-sine waves can be limited to a certain voltage that is less than zero to create missing pulses.

FIG. 31C depicts a missing pulse 1714 where less than half of a positive half-sine wave is removed. For the portion of the half-sine wave that is removed, the voltage may return to zero as shown in FIG. 31C, or to some non-zero voltage. FIG. 31D depicts a missing pulse 1716 where portions of both the positive and negative half-sine waves are removed. While half of each half-sine wave is shown removed in FIG. 31D, more or less than half can be removed from either half-sine wave.

A receiver may generate a reference sine wave to determine whether a pulse is missing. The receiver may determine that a pulse is missing when the received power signal differs from the reference sine wave by more than a certain percentage or absolute amount for more than a predetermined period of time. To avoid having to generate a reference sine wave, the receiver may establish one or more reference points to determine whether a pulse is missing.

For example, a reference point 1718-1 may be defined for the positive half-sine wave of FIG. 31A. The reference point 1718-1 includes amplitude information and may include time information. The time information may specify when to measure amplitude within a period of the voltage waveform 1700. For instance, the reference point 1718-1 may specify that the measurement is to be taken at the 25% point of the period, where each period begins at the positive-going zero crossing, such as point 1710-1.

The 25% point of such a period falls in the middle of the positive half-sine wave. A full pulse occurs when the incoming power signal exceeds the voltage of the reference point 1718-1 at the 25% point. When the incoming power signal is less than the voltage of the reference point 1718-1 at the 25% point, as it is for the missing pulse 1702, a missing pulse is detected.

The receiver may measure whether the voltage waveform 1700 exceeds the voltage of the reference point 1718-1 at any time within the period. In this case, the reference point 1718-1 does not need to include time information. For full pulses, the voltage waveform 1700 will exceed the reference point 1718-1 around the 25% point (such as between 20% and 30%). For the positive missing pulse 1702 of FIG. 31A, the voltage waveform 1700 will not exceed the reference point 1718-1 during the entire missing pulse period. A similar reference point can be defined for negative missing pulses, such as for the second missing pulse 1704.

For the missing pulse 1712 of FIG. 31B, a reference point 1718-2 may be configured similarly to the reference point 1718-1. Because there is less difference between the voltage of a full pulse and the voltage of a missing pulse in FIG. 31B, the reference point 1718-2 should be defined more accurately. Detection of such missing pulses may be more prone to errors from noise.

Reference points 1718-3 and 1718-4 can be defined for the missing pulses 1714 and 1716 of FIGS. 31C and 31D, respectively. Reference points 1718-3 and 1718-4 include timing information because portions of the missing pulses exceed the voltages of the reference points 1718-3 and 1718-4. The reference points 1718-3 and 1718-4 are therefore evaluated in specific regions of the power signal.

The reference point 1718-3 may indicate that its voltage should be compared to a measurement taken in the second quarter of the period, where periods are defined to start at the positive-going zero crossing 1710-1. The reference point 1718-4 may indicate that its voltage should be compared to a measurement taken in the fourth quarter of the period.

Referring now to FIG. 32, a graphical depiction of an exemplary user interface 1720 is presented. The user interface 1720 may include one or more buttons, such as buttons 1722-1, 1722-2, 1722-3, and 1722-4, collectively buttons 1722. By pressing one of the buttons 1722, the user can select a predetermined load characteristic. The buttons 1722 and/or corresponding areas of the user interface 1720 may include indicia describing the function associated with each button 1722.

For example only, button 1722-1 may toggle between full on and off. Button 1722-2 may select full on for 30 minutes followed by half on for 15 minutes followed by off. Button 1722-3 may select quarter on for 3 hours followed by off. Button 1722-4 may select full on for 2 hours followed by quarter on. The predetermined characteristics of the buttons 1722 may be changed by the user via the user interface 1720, or may be modified using parameter control modules as described in more detail below. The user interface 1720 may also include such interface elements as a keypad, an LCD display, knobs, switches, and/or levers.

Referring now to FIGS. 33A-33C, functional block diagrams of exemplary parameter control modules are presented. The parameter control modules allow a user to change functions associated with the buttons. In FIG. 33A, a parameter control module 1750 includes dip switches 1752. The dip switches 1752 may select lengths of time and/or intensities at which to operate the load. For example, the dip switches 1752 may select one or more of M intensities and one or more of N time periods.

In FIG. 33B, a parameter control module 1760 includes one or more potentiometers 1762. The potentiometers 1762 provide for fine adjustment of duration and intensity of load operation. For example, one or more of the potentiometers 1762 may determine intensity ranging from 0% to 100%, while one or more of the potentiometers 1762 may determine time periods ranging from 0 minutes to a predetermined upper limit.

In FIG. 33C, a parameter control module 1770 includes nonvolatile storage 1772. Nonvolatile storage 1772 may be programmed at time of installation or may be updated via a user interface or via computer control. The parameter control modules 1750 may be located in the master controller 1600-1, the controllable device 1602-1, or remotely.

The parameter control modules 1750 may contain load operation characteristic presets that are selected by a user. Nonvolatile storage 1772 may comprise removable storage, such as flash memory cards. A user can remove nonvolatile storage 1772 from the parameter control module 1770 and update its contents using widely-available memory card computer interfaces.

Figure 34A:
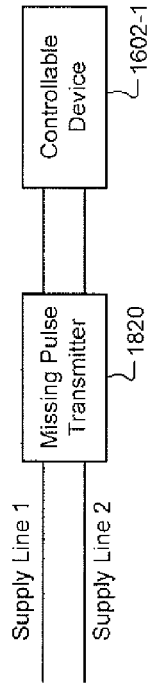
FIGS. 34A and 35A are functional block diagrams of exemplary wiring configurations for missing pulse transmitters according to the principles of the present disclosure.
Figure 35A:
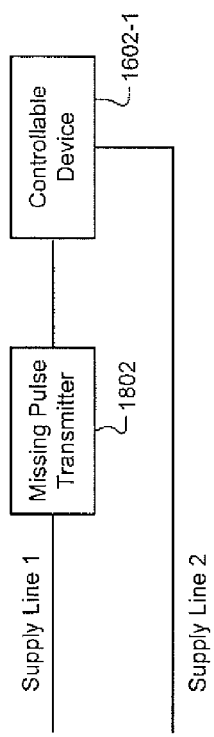
Figure 34B:
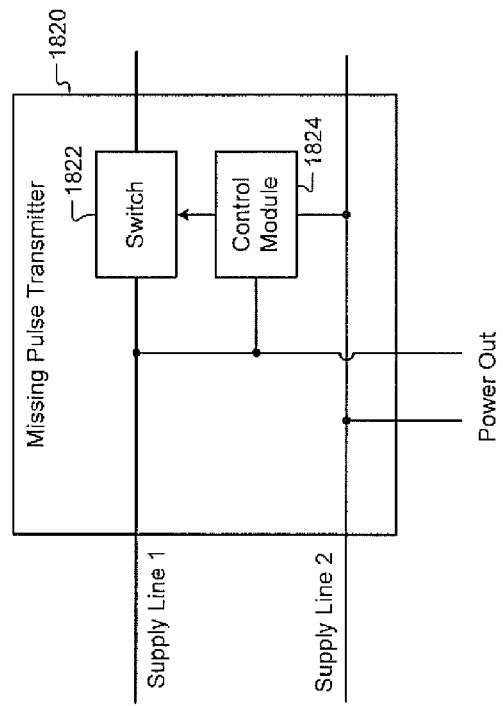
FIGS. 34B and 35B are functional block diagrams of exemplary missing pulse transmitters according to the principles of the present disclosure.
Figure 35B:
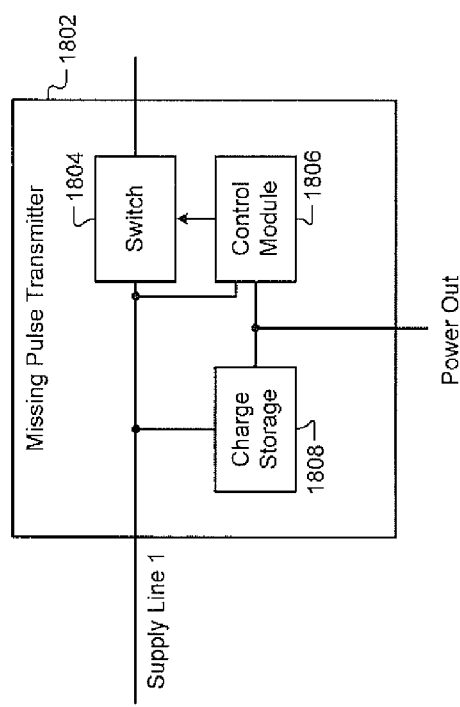
Figure 36A:
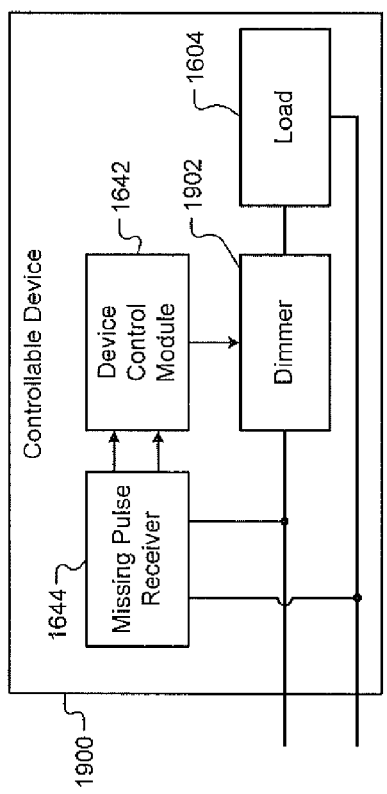
FIGS. 36A-B are functional block diagrams of exemplary controllable devices according to the principles of the present disclosure.

FIGS. 34A and 35A depict possible wiring configurations. In FIG. 34A, only one supply line is available to the master controller. In FIG. 35A, two supply lines are available to the master controller. FIGS. 34B and 35B depict exemplary implementations of missing pulse transmitters corresponding to these two wiring configurations.

Referring now to FIG. 34A, the missing pulse transmitter 1802 receives the first supply line. The missing pulse transmitter 1802 connects, with the exception of missing pulses, the first supply line to the controllable device 1602-1. The controllable device 1602-1 receives the second supply line. In FIG. 34B, the missing pulse transmitter 1802 includes a switch 1804, a control module 1806, and a charge storage module 1808. The switch 1804 receives the first supply line and selectively outputs power to the controllable device 1602-1.

The switch 1804 may include a triac or any other suitable device. The charge storage module 1808 stores charge from the first supply line. The charge storage module 1808 provides power to the control module 1806 and also outside of the missing pulse transmitter 1802 to other components of the master controller 1600-1. The charge storage module 1808 may receive charge when the switch 1804 opens and current from the first supply line stops flowing through the switch 1804.

In order to maintain a certain charge level in the charge storage module 1808, the switch 1804 may intermittently suspend current flow to force charge into the charge storage module 1808. The switch 1804 may remove a pulse periodically, such as once per second, for this purpose. This periodic missing pulse may also serve as a synchronization pulse for downstream components. The control module 1806 receives the first supply line to synchronize missing pulses with the incoming power signal.

Referring now to FIG. 35A, a missing pulse transmitter 1820 receives power from the first and second supply lines. The missing pulse transmitter 1820 selectively communicates power to the controllable device 1602-1 via first and second conductors. The missing pulse transmitter 1820 may transmit missing pulses to the controllable device 1602-1 via either or both conductors.

In FIG. 35B, the missing pulse transmitter 1820 includes a switch 1822 and a control module 1824. The switch 1822 receives one of the first and second supply lines. The switch 1822 selectively allows power from the supply line through to the controllable device 1602-1. The control module 1824 receives power from the first and second supply lines and controls operation of the switch 1822. Power is communicated to other components of the master controller 1600-1 via connections to the first and second supply lines within the missing pulse transmitter 1820.

Figure 36B:
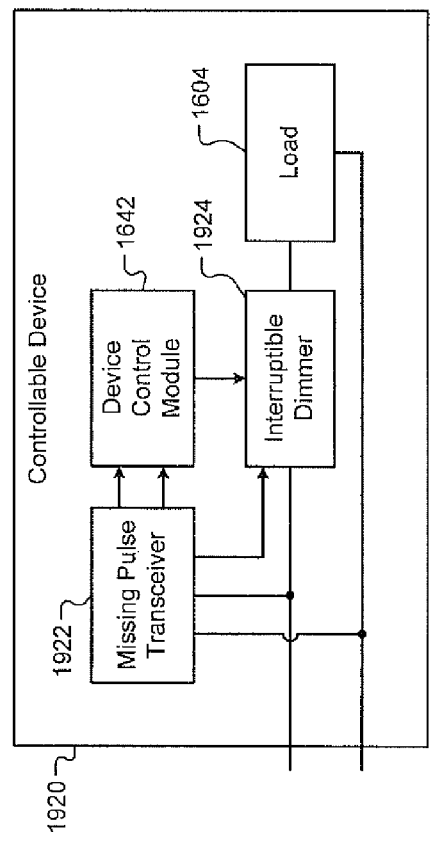

Referring now to FIGS. 36A and 36B, functional block diagrams of exemplary controllable devices are presented. In FIG. 36A, a controllable device 1900 includes the missing pulse receiver 1644, the device control module 1642, the load 1604, and a dimmer module 1902. For purposes of example only, two connections are shown between the missing pulse receiver and the device control module 1642.

The two connections may carry power and control data, respectively. The device control module 1642 controls operation of the dimmer module 1902. The dimmer module 1902 reduces the average power traveling to the load 1604. While not shown in FIG. 36A, the controllable device 1900 may include the parameter control module 1646 and/or the computer interface 1648 as shown in FIG. 30.

In FIG. 36B, a controllable device 1920 includes a missing pulse transceiver 1922, the device control module 1642, an interruptible dimmer module 1924, and the load 1604. The interruptible dimmer module 1924 can turn off for individual pulses of the incoming voltage waveform, such as the voltage waveform 1700 of FIG. 31. This functionality is controlled by the missing pulse transceiver 1922.

The missing pulse transceiver 1922 can communicate data to the master controller 1600-1 by instructing the interruptible dimmer module 1924 to turn at least partially off for specified pulses of the voltage waveform 1700. This action can be observed by the receiver/current detector 1622 of the master controller 1600-1 as a decrease in current for those pulses that are interrupted by the interruptible dimmer module 1924. In this way, bidirectional communication is possible between the controllable device 1920 and the master controller 1600-1.

Referring now to FIG. 37, a functional block diagram of an exemplary device control module 1642 is presented. The device control module 1642 includes a power supply 1950 that provides power to the components of the device control module 1642. The power supply 1950 may include a regulated DC power supply and may be implemented within the missing pulse receiver 1644 or the missing pulse transceiver 1922.

The device control module 1642 also receives control data from the missing pulse receiver 1644 or the missing pulse transceiver 1922. This control data is communicated to a timer value storage module 1952 and a level value storage module 1954. The timer value storage module 1952 stores values to be used by a timer 1956.

In various implementations, the timer 1956 begins running when the load 1604 is first turned on. When the timer 1956 reaches the first time specified by the timer value storage module 1952, the timer communicates an increment signal to the level value storage module 1954. The increment signal indicates that the level value storage module 1954 should select the next level value.

These level values are communicated from the level value storage module 1954 to a level control module 1958. The level control module 1958 then operates the switch 1640, the dimmer module 1902, or the interruptible dimmer module 1924. The level control module 1958 may select between on and off or may select various intensity levels between on and off. The timer value storage module 1952 and the level value storage module 1954 may include hard-coded or pre-programmed presets that are selected by the incoming control signal. They may also receive time and level value data via the incoming control signal.

The amount of storage present in the timer value storage module 1952 and the level value storage module 1954 determines how complex the load control characteristic can be. In various implementations, the level value storage module 1954 contains a storage location for every storage location in the timer value storage module 1952. In this way, each period of time tracked by the timer 1956 corresponds to a level in the level value storage module 1954.

Referring now to FIG. 38, a functional block diagram of an exemplary installation programmer 2002 is presented. The installation programmer 2002 can be used to program values into the controllable device 1602 prior to the controllable device 1602 being installed. The installation programmer 2002 can be used to program controllable devices that receive data via missing pulses without having to install light switches that can transmit missing pulses. The installation programmer 2002 may also be used to program controllable devices that can be programmed by toggling a light switch.

For example, if the controllable device 1602 includes a light bulb, the installation programmer 2002 can store parameters into the light bulb before the light bulb is screwed into a socket. The parameters programmed into the controllable device 1602 may include times and intensities. For example, the controllable device 1602 may be programmed to turn on at 100% intensity for one hour, transition to 50% intensity for another hour, and then turn off. This sequence may be initiated, once the controllable device 1602 is installed, by supplying power via a standard light switch. Once the controllable device 1602 has turned off after two hours, the light switch may be toggled to restart the lighting sequence.

In other examples, a set of parameters for a controllable device to be installed in a kitchen may include turning on at 100% intensity for two hours followed by a lesser intensity, such as 40%, for one hour. In another example, a set of parameters for installation in a bathroom may include turning on at 100% intensity for 15 minutes followed by a lesser intensity, such as 40%, for 15 minutes.

The installation programmer 2002 may program multiple parameter sets into the controllable device 1602. These parameter sets may be selected once the controllable device 1602 is installed by toggling an associated light switch in a predetermined pattern. For example, supplying power to the controllable device 1602 by turning on a light switch may select a first set of parameters. Turning the light switch on, off, and then quickly back on may select a second set of parameters. Turning the light switch on, off, on, off, and on in rapid succession may select a third set of parameters. Other toggling schemes are described in more detail above, and may be used to select parameter sets.

In addition to programming the controllable device 1602, the installation programmer 2002 may be able to read the current programming state of the controllable device 1602. This may then be displayed to the user or stored within the installation programmer 2002. If stored, the programming state can be used to program other controllable devices. For example, if the controllable device 1602 fails, a new controllable device can be purchased and programmed to the same programming state.

The installation programmer 2002 includes a missing pulse transmitter 2004. The missing pulse transmitter 2004 receives power from one or more supply lines and supplies power to the controllable device 1602. As described above, the missing pulse transmitter 2004 can transmit data to the controllable device 1602 by temporarily interrupting or reducing the flow of power to the controllable device 1602. A power supply 2006 receives power from the supply lines and provides power to components of the installation programmer 2002.

The missing pulse transmitter 2004 may be capable of interrupting power to the controllable device 1602 for a time longer than one period of the power supply signal. In this way, the missing pulse transmitter 2004 can be used to produce on and off sequences similar to those produced by a user toggling a light switch. This allows the installation programmer 2002 to program controllable devices that include programming modules such as the programming module 754 of FIG. 13, the programming module 804 of FIG. 14, and the programming module 904 of FIG. 16.

The installation programmer 2002 includes a control module 2010. The control module 2010 sends data to the missing pulse transmitter 2004, which then encodes the data on the power signal sent to the controllable device 1602. The control module 2010 determines data for transmission to the controllable device 1602 based upon user input. User input may be received from the user input module 2014.

For example only, the user input module 2014 may include a single button. The button may be pressed once the controllable device 1602 is connected to the installation programmer 2002. In various other implementations, the user input module 2014 may include a plurality of buttons, each corresponding to a set of parameters to be stored into the controllable device 1602. The user input module 2014 may be used to select a set of parameters from nonvolatile memory 2022 to be programmed into the controllable device 1602.

The user input module 2014 may also allow a user to specify values, such as intensities and times, for programming into the controllable device 1602. Values entered by the user or stored in nonvolatile memory 2022 may be displayed on a display 2018. In various implementations, a computer interface 2026 may communicate with a computer, a handheld device, etc. The control module 2010 may receive parameters for storing to the controllable device 1602 via the computer interface 2026.

Values received from the computer interface 2026 and user input module 2014 may be stored for future use in nonvolatile memory 2022. The installation programmer 2002 may also include a receiver/current detector 2030. The receiver/current detector 2030 receives the power signal from the missing pulse transmitter 2004 to the controllable device 1602.

The controllable device 1602 may communicate information to the installation programmer 2002 by interrupting the consumption of power of the controllable device 1602. This power consumption interruption is detected by the receiver/ current detector 2030. The controllable device 1602 may, for example, provide the parameter set or sets currently stored to the installation programmer 2002. The control module 2010 may store these parameter sets into nonvolatile memory 2022 for future use.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A controllable light fixture comprising:
 a receiver module powered by a power signal, wherein the receiver module comprises a timing module configured to begin counting in response to the power signal being received, and wherein the receiver module is configured to
  determine control parameters in response to on/off modulation of the power signal, wherein the control parameters include a predetermined value;
  set the predetermined value based on a duration that the power signal is on after a programming mode is initiated; and
  selectively generate a control signal, based on the control parameters, in response to the timing module reaching the predetermined value;
 an electronic switch configured to (i) output an output power signal based on the power signal and (ii) reduce the output power signal in response to the control signal; and
 an electrical connector configured to (i) mechanically and electrically connect to a light bulb and (ii) provide the output power signal to the light bulb.

2. The controllable light fixture of claim 1, wherein the on/off modulation comprises a count over a predetermined period of time of one of power signal presence and power signal absence.

3. The controllable light fixture of claim 1, wherein the on/off modulation comprises binary data collected at periodic sampling intervals, wherein a first binary state corresponds to power signal presence and a second binary state corresponds to power signal absence.

4. The controllable light fixture of claim 1, wherein the on/off modulation comprises binary data determined by periods of one of power signal presence and power signal absence, wherein a first binary state corresponds to periods shorter than a predetermined length and a second binary state corresponds to periods longer than the predetermined length.

5. The controllable light fixture of claim 1, wherein the receiver module is configured to determine the control parameters after the on/off modulation indicates initiation of the programming mode.

6. The controllable light fixture of claim 5, wherein a predetermined on/off sequence occurring during a predetermined period of time in the on/off modulation indicates initiation of the programming mode.

7. The controllable light fixture of claim 1, wherein the electronic switch is configured to reduce the output power signal to approximately zero in response to receiving the control signal.

8. The controllable light fixture of claim 1, wherein the electronic switch is configured to reduce the output power signal to a dimmed value in response to receiving the control signal.

9. The controllable light fixture of claim 1, wherein the receiver module comprises a power line carrier receiver module associated with a first address, wherein the power line carrier receiver module is configured to (i) receive data via the power signal and (ii) accept commands addressed to one of the first address and a global address, wherein the control parameters include the first address, and wherein the receiver module is configured to generate the control signal based on the data.

10. The controllable light fixture of claim 9, wherein the power line carrier receiver module is configured to perform an operation based on the on/off modulation.

11. The controllable light fixture of claim 10, wherein the operation is at least one of a reset address operation, an update address operation, a broadcast connection operation, and a transmit address operation.

12. The controllable light fixture of claim 1, wherein the receiver module is configured to decrease the predetermined value when the power signal is turned off before the timing module reaches the predetermined value.

13. The controllable light fixture of claim 12, wherein the receiver module is configured to increase the predetermined value when the power signal is turned off then on within a predetermined period after the timing module reaches the predetermined value.

14. The controllable light fixture of claim 1, wherein the receiver module is configured to decrease the predetermined value when the power signal is turned off, on, and off within a predetermined period, and before the timing module reaches the predetermined value.

15. The controllable light fixture of claim 14, wherein the receiver module is configured to increase the predetermined value when the power signal is turned off, on, off, and on within a second predetermined period after the timing module reaches the predetermined value.

16. The controllable light fixture of claim 1, wherein the electrical connector comprises conducting female threads and a conducting contact.

17. A method of operating a controllable light fixture that provides a mechanical and electrical connection to a light bulb, the method comprising:
 receiving a power signal;
 outputting an output power signal, based on the power signal, to the light bulb;
 tracking a length of a time period since the power signal has been on;
 determining control parameters in response to on/off modulation of the power signal, wherein the control parameters include a predetermined value;
 setting the predetermined value based on a duration that the power signal is on after a programming mode is initiated;
 selectively generating a control signal, based on the control parameters, in response to the length reaching the predetermined value; and
 reducing the output power signal in response to the control signal.

18. The method of claim 17, wherein the on/off modulation comprises a count over a predetermined period of time of one of power signal presence and power signal absence.

19. The method of claim 17, wherein the on/off modulation comprises binary data collected at periodic sampling intervals, wherein a first binary state corresponds to power signal presence and a second binary state corresponds to power signal absence.

20. The method of claim 17, wherein the on/off modulation comprises binary data determined by periods of one of power signal presence and power signal absence, wherein a first binary state corresponds to periods shorter than a predetermined length and a second binary state corresponds to periods longer than the predetermined length.

21. The method of claim 17, further comprising determining the control parameters after the on/off modulation indicates initiation of the programming mode.

22. The method of claim 21, wherein a predetermined on/off sequence occurring during a predetermined period of time in the on/off modulation indicates initiation of the programming mode.

23. The method of claim 17, further comprising reducing the output power signal to approximately zero in response to receiving the control signal.

24. The method of claim 17, further comprising reducing the output power signal to a dimmed value in response to receiving the control signal.

25. The method of claim 17, further comprising:
receiving power line carrier data via the power signal;
accepting commands addressed to one of (i) a first address associated with the controllable light fixture and (ii) a global address, wherein the control parameters include the first address; and
generating the control signal based on the data.

26. The method of claim 25, further comprising performing a power line carrier operation based on the on/off modulation.

27. The method of claim 26, wherein the power line carrier operation is at least one of a reset address operation, an update address operation, a broadcast connection operation, and a transmit address operation.

28. The method of claim 17, further comprising decreasing the predetermined value when the power signal is turned off before the length reaches the predetermined value.

29. The method of claim 28, further comprising increasing the predetermined value when the power signal is turned off then on within a predetermined period after the length reaches the predetermined value.

30. The method of claim 17, further comprising decreasing the predetermined value when the power signal is turned off, on, and off within a predetermined period, and before the length reaches the predetermined value.

31. The method of claim 30, further comprising increasing the predetermined value when the power signal is turned off, on, off, and on within a second predetermined period after the length reaches the predetermined value.

* * * * *